United States Patent [19]
Kieras et al.

[11] Patent Number: 6,047,525
[45] Date of Patent: Apr. 11, 2000

[54] PLANT FOR MANUFACTURING AND PACKING THERMOPLASTIC TUBES

[75] Inventors: Ronald E. Kieras, Woodstock; John J. Rhoades, Poplar Grove, both of Ill.

[73] Assignee: Thatcher Tubes LLC, Woodstock, Ill.

[21] Appl. No.: 09/199,617

[22] Filed: Nov. 25, 1998

[51] Int. Cl.[7] .......................... B65B 43/00; B65B 57/00; B65B 61/02

[52] U.S. Cl. .............................. 53/411; 53/167; 53/253; 53/452; 53/561

[58] Field of Search .............................. 53/452, 561, 411, 53/167, 202, 251, 250, 253, 505, 52, 558, 490, 485, 133.2, 133.1, 131.4, 131.2

[56] References Cited

U.S. PATENT DOCUMENTS

| | | | |
|---|---|---|---|
| 3,047,910 | 8/1962 | Downs | 18/59 |
| 4,021,992 | 5/1977 | Spaude et al. | 53/167 X |
| 4,123,312 | 10/1978 | Schmid et al. | 156/466 |
| 4,604,850 | 8/1986 | Reil | 53/452 X |
| 4,807,421 | 2/1989 | Araki et al. | 53/167 |
| 5,069,021 | 12/1991 | Reil et al. | 53/561 X |
| 5,069,856 | 12/1991 | Holoubek et al. | 264/519 |
| 5,211,798 | 5/1993 | Keller | 156/500 |
| 5,621,960 | 4/1997 | Kaminski | 53/561 X |
| 5,628,162 | 5/1997 | Kreusch et al. | 53/167 X |

OTHER PUBLICATIONS

Brochure—SAESA HS–150 Laminate Tube–Making System (No Date).

Brochure—The Fully Automatic Laminate Tube Production Line—SAESA 801, 802 (No Date).

*Primary Examiner*—James F. Coan
*Attorney, Agent, or Firm*—Armstrong, Westerman, Hattori, McLeland & Naughton

[57] ABSTRACT

The plant for manufacturing and packing thermoplastic tubes of the present invention is an efficient arrangement of a plurality of single machines, each one producing the same finished thermoplastic tubes as from a conventional line. The machines are arranged into small groups or production cells. The manufacturing and packing plant of the present invention is at least one production cell associated with a common product transportation line. The method of operating the plant of the present invention involves marking each tube with an indicia and identifying, recording, and monitoring each tube with an indicia.

22 Claims, 20 Drawing Sheets

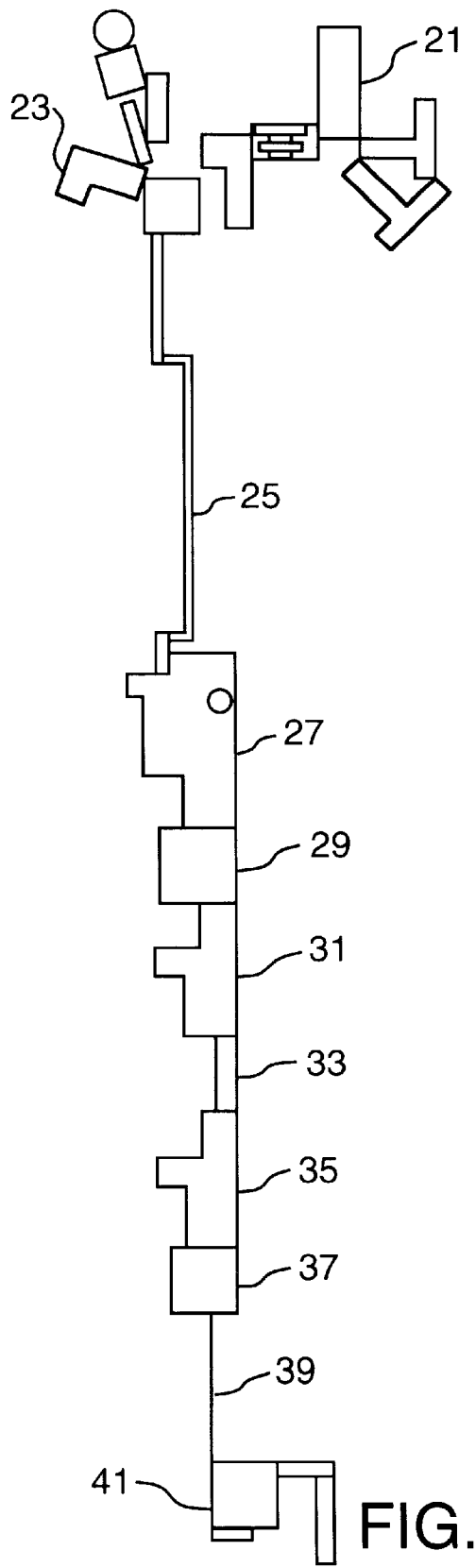
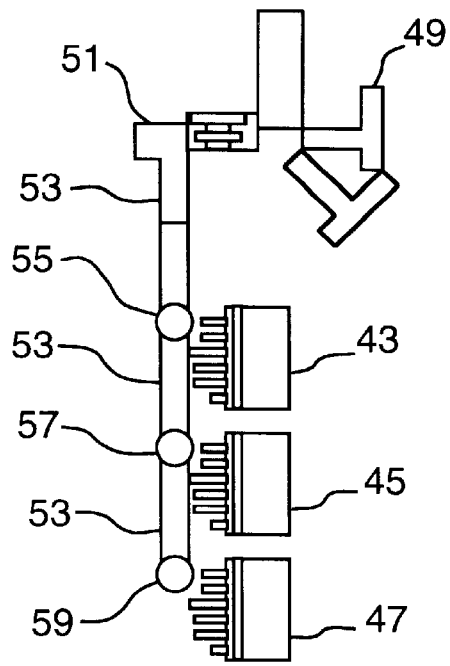
FIG. 3
FIG. 2 Prior Art

PLANT FOR MANUFACTURING AND PACKING THERMOPLASTIC TUBES

CROSS REFERENCE TO RELATED APPLICATIONS

This application is related to three co-pending applications: "Machine for Manufacturing Thermoplastic Tubes" filed even date herewith in the names of Ronald E. Kieras and John J. Rhoades; "Method for Manufacturing Thermoplastic Tubes" filed even date herewith in the names of Ronald E. Kieras and John J. Rhoades; and "Process Control Method for a Machine for Manufacturing Thermoplastic Tubes" filed even date herewith in the names of Ronald E. Kieras, John J. Rhoades and Thomas A. Frazier; which applications are assigned to the assignee of the present application and all three incorporated by reference herein.

FIELD OF THE INVENTION

The present invention is a plant for manufacturing and packing thermoplastic tubes.

BACKGROUND OF THE INVENTION

The machinery commonly used today for making finished, headed thermoplastic tubes from 2 to 10 inches in length and from ½ inch to 3 inches in diameter comprises a series of machines arranged linearly and having a total process line length of about 80 to 100 feet and a total height of about 20 to 30 feet. Process lines of such dimensions are housed in factories often having several acres of floor space.

A conventional process line for producing a single type of thermoplastic tube in today's manufacturing plants includes machines for heating raw polymer material into molten plastic; extruding the molten plastic through a die to form an extruded, stretched hollow cylinder; cooling and then cutting the hollow cylinder into sleeves of equal lengths; transporting the sleeves to a machine for molding a head on one end of the sleeves to form headed tubes; transporting the headed tubes to another machine for decorating or applying a graphic to the headed tubes; transporting the printed tubes to yet another machine for applying a coating; transporting the printed tubes to a different machine for applying a cap to the headed end of the tubes and transporting the capped tubes to a final machine for unloading the tubes from the process line. The removed tubes are then packed for inventory or shipment. Such a process line requires at least four workers during operation, with one worker at the extrusion machine, at least two workers along the line to monitor the tube conveyors and other various machines and a final worker to pack the finished tubes at the end of the line.

Increasing size has dominated production equipment design in an effort to take advantage of economies associated with large scale. A conventional process line can simultaneously handle several hundred tubes in different stages of production. While some production advantages can be achieved by large size, many limitations exist, even in view of the giant size of the machinery.

Plants using conventional process lines have inherent manufacturing inefficiencies dictated by several factors such as those associated with the line machinery itself namely: large scale, mechanical operation, and process limitations as well as other inefficiencies like unit cost limitations and the number of process lines employed. Manufacturing inefficiencies, like those described below, are serious barriers which ultimately can limit the varieties of tubes available in the market.

Large scale processing machines have land, capital, and labor requirements, the costs of which are high. Additionally, large scale equipment is complex and as a result it requires more labor and higher skilled labor to operate and maintain. Most importantly, large scale design does not necessarily improve total efficiency. While production capacity may be increased, it may be done at the cost of efficiency. Complex machines require a significant amount of capital, time and labor input which can mean low overall efficiency when compared to the output.

The mechanical operation of conventional line machinery can add inefficiency to the manufacturing process. Process line down-time is inevitable because of the mechanical constraints of current machinery. For example, about 70% to 80% of line down-time is attributable to the sleeve and conveyor systems. One process line will have several transport systems, each system typically being a long chain with tube holding mandrels spaced every couple of inches, wrapped around many drive gears. These chain systems easily become jammed, frequently deliver improperly positioned articles to the process machinery and often need to be stopped for adjustment and resetting. As a result of stopping one transport system, the entire manufacturing line must be shut down.

Line down-time results in production loss. If one of the processing machines on the line malfunctions on the night shift, for example, when an engineer is not available to correct the problem, the entire line will be stopped and it will remain idle until morning. This loss is inefficient and costly to a manufacturer.

The inflexibility of the production equipment creates inherent constraints on the manufacturing process. Line equipment cannot easily be rearranged to effectuate different manufacturing processes because the individual machines weigh thousands of pounds and are not readily mobile. Furthermore, large scale machines are built for a single purpose and are limited to that purpose. For example, offset printing machines are limited to printing articles by the offset printing method. Thus the arrangement of production equipment limits the number of processing methods available to a manufacturer.

Process control for monitoring and controlling the quality of each individual tube product is not commercially available for adaption to current machinery. For example, there is no known practical way to identify, monitor, record and track defective products during the manufacturing process. Defective products are removed only at the end of the line. When a defect occurs on a tube at the beginning of the line, continued processing of that tube is inefficient since the tube will eventually be discarded.

Because an 80 to 100 foot tube production line requires at least four laborers per shift, has a predictable defect rate, requires time to retool for each job and costs money even to remain idle, it creates a high manufacturing cost that can only be lowered by large production jobs. It is a waste of resources to manufacture small numbers of tubes on such large machinery because the manufacturing cost per tube is too high. Therefore production plants can be limited to certain size manufacturing jobs in order to recapture manufacturing costs.

Today's plants for manufacturing and packing thermoplastic tubes typically house five or six process lines so that five or six different types of tubes may be made simultaneously and a single plant has at least a couple of different line layouts which create different processing methods. Unfortunately, low production costs are only achieved for large single manufacturing jobs because large volume is necessary to offset of the high cost of production inefficiencies for conventional manufacturing.

OBJECTS OF THE INVENTION

It is the principle object of the invention to provide a plant for manufacturing and packing thermoplastic tubes that efficiently uses land, labor and capital.

It is another object of the present invention to provide a plant for manufacturing and packing thermoplastic tubes which achieves improved production efficiency as compared to plants using conventional process lines.

It is yet another object of the present invention to provide a plant for manufacturing and packing thermoplastic tubes that can accommodate a large variety of different process methods.

It is still another object of the present invention to provide a plant for manufacturing and packing thermoplastic tubes that can manufacture large numbers of tubes as well as small numbers of tubes at similar operational costs.

It is a still a further object of the present invention to provide a plant for manufacturing and packing thermoplastic tubes which can account for, index, identify, monitor, record and track every article being handled and transported through the plant.

It is yet a further object of the present invention to provide a plant for manufacturing and packing thermoplastic tubes that are ideal for the pharmaceutical industry.

It is a further object of the present invention to provide an efficient method for operating a plant for manufacturing and packing thermoplastic tubes.

It is a specific object of the present invention to provide a plant for manufacturing and packing thermoplastic tubes which uses only 25% of the total space of a similar capacity conventional manufacturing plant.

It is another specific object of the present invention to provide a plant for manufacturing and packing thermoplastic tubes that uses approximately one third less labor than similar capacity plants using conventional process equipment.

Other objects, features and advantages of the present invention will become apparent from the following detailed description taken in conjunction with the accompanying drawings.

The aforementioned disadvantages of today's thermoplastic tube plants using conventional process line equipment are overcome by the manufacturing and packing plant of the present invention. The plant of the present invention does not use conventional process line equipment to manufacture thermoplastic tubes and is therefore free of the associated production inefficiencies.

SUMMARY OF THE INVENTION

The manufacturing and packing plant of the present invention is an efficient arrangement of at least one, but more often a plurality of manufacturing machines, each one producing the same finished products as from a conventional process line, such that savings are achieved in land, labor, capital, time and raw materials and benefits are reaped in improved product quality.

A plant for manufacturing thermoplastic tubes of the present invention has at least one "production cell" associated with a common product transportation line. Each production cell comprises:

at least one thermoplastic tube manufacturing machine, having a plurality of manufacturing stations arranged in a closed path;

at least one packing machine associated with the common product transportation line;

at least one extrusion machine for extruding an elongated thermoplastic hollow body which is cut into sleeves, associated with a sleeve conveyor;

at least one sleeve conveyor for transporting the sleeves from at least one extrusion machine to at least one thermoplastic tube manufacturing machine for manufacturing tubes from the sleeves;

at least one means for transporting the tubes from at least one thermoplastic tube manufacturing machine to at least one packing machine; and at least one means for transporting the tubes from at least one packing machine to the common product transportation line.

The manufacturing and packing plant of the present invention includes a machine which can manufacture sealed, capped and decorated thermoplastic tubes from blank thermoplastic sleeves. The machine comprises a series of modular manufacturing stations. The modular manufacturing stations are equivalent in function to the large machines along a conventional process line and they are arranged in a closed path, with an indexing device transportation means, i.e) an indexing table or indexing drum, to carry thermoplastic articles around the closed path to each of the manufacturing stations. The modular manufacturing stations can be added, removed or rearranged to create a variety of different manufacturing processes and they are simplistic in design which lowers the necessary capital and labor inputs. Furthermore, accurate process control may be added to the machines used in the present invention which creates labor savings, improves efficiency and reduces product waste.

Additional efficiencies of the individual machines are provided by their arrangement into small groups. When arranged into small groups or "production cells," space, labor and raw material input can be saved. One production cell typically contains six machines each of which can manufacture headed, protective sealed, by foil or other means, capped and decorated tubes from blank thermoplastic sleeves. A single cell can have a total output equivalent to a single conventional process line.

BRIEF DESCRIPTION OF THE DRAWINGS

FIG. 2 is a schematic view of a single prior art process line for manufacturing thermoplastic tubes;

FIG. 3 is a schematic view of an arrangement of three manufacturing machines of the present invention for manufacturing thermoplastic tubes;

DETAILED DESCRIPTION OF THE INVENTION

Figure 1:
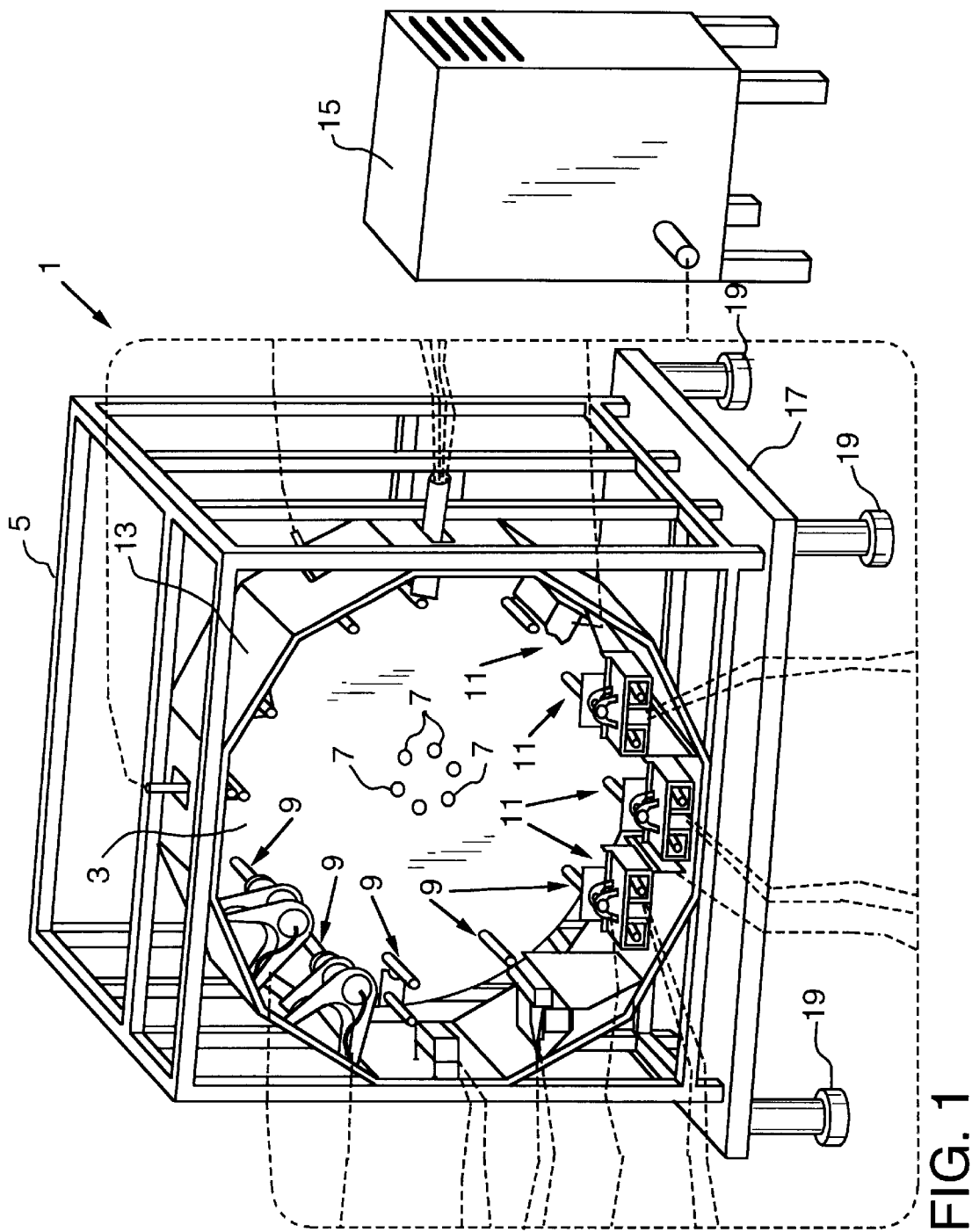
FIG. 1 is a schematic view of a machine used in the present invention of a first embodiment having a PLC device.

The manufacturing and packing plant of the present invention is an efficient arrangement of manufacturing machines, each one producing the same finished products as from a conventional process line, such that savings are achieved in land, labor, capital, time and raw materials and benefits are reaped in improved product quality.

I. Machines Used in a Plant of the Present Invention

The machine used in the present invention manufactures thermoplastic tubes from thermoplastic sleeves by a variety of different process methods. The machine is a single apparatus having an indexing device transportation means, i.e) an indexing table or indexing drum, with a plurality of supporting means or mandrels for holding hollow thermoplastic sleeves for the purpose of transporting or advancing the same around a closed manufacturing path. The manufacturing path of the machine used in the present invention comprises a series of stations which have mechanical devices for carrying out the manufacturing steps necessary to produce thermoplastic tubes from thermoplastic sleeves.

A tube, as the term is used herein, refers to any thermoplastic sleeve having at least a head on one end. A sleeve, as the term is used herein, is a hollow body of a discrete size of any shape. A sleeve may be fabricated from a sheet, extruded in sleeve form, or made by any other known means. The sleeves used in the present invention are preferably cut from an elongated longitudinally stretched and extruded thermoplastic hollow cylinder.

In addition to forming a head on a thermoplastic sleeve, there are many other manufacturing process steps that may be performed on a thermoplastic sleeve such as decorating, securing a cap to the headed end, marking articles with indicia, etc. All manufacturing steps are performed by the manufacturing stations located around the closed manufacturing path.

The stations of the manufacturing path of the present machine are modular so that they may be removed, added or rearranged; the stations may be optionally connected to a programmable logic controller (PLC) and may optionally have sensors for information feedback to the PLC device and feedback process control. The flexibility to add, remove or rearrange manufacturing stations gives the machine used in the present invention the capacity to carry out a variety of different manufacturing methods for making thermoplastic tubes.

The configuration of the machine used in the present invention i.e.) the configuration of the indexing device, manufacturing path and optional PLC device, depends on the desired tube to be produced. If only a simple tube is desired than the machine may be configured with the minimum stations necessary, namely a load station; a station for forming a head; and an unload station. Such a machine may also be appropriate if the sleeves are previously decorated or preprinted and only the manufacturing of a head is desired. If a decorated tube with a cap secured to the headed end is desired then the machine can be arranged with additional stations for decorating and securing a cap to the tube.

Figure 5:
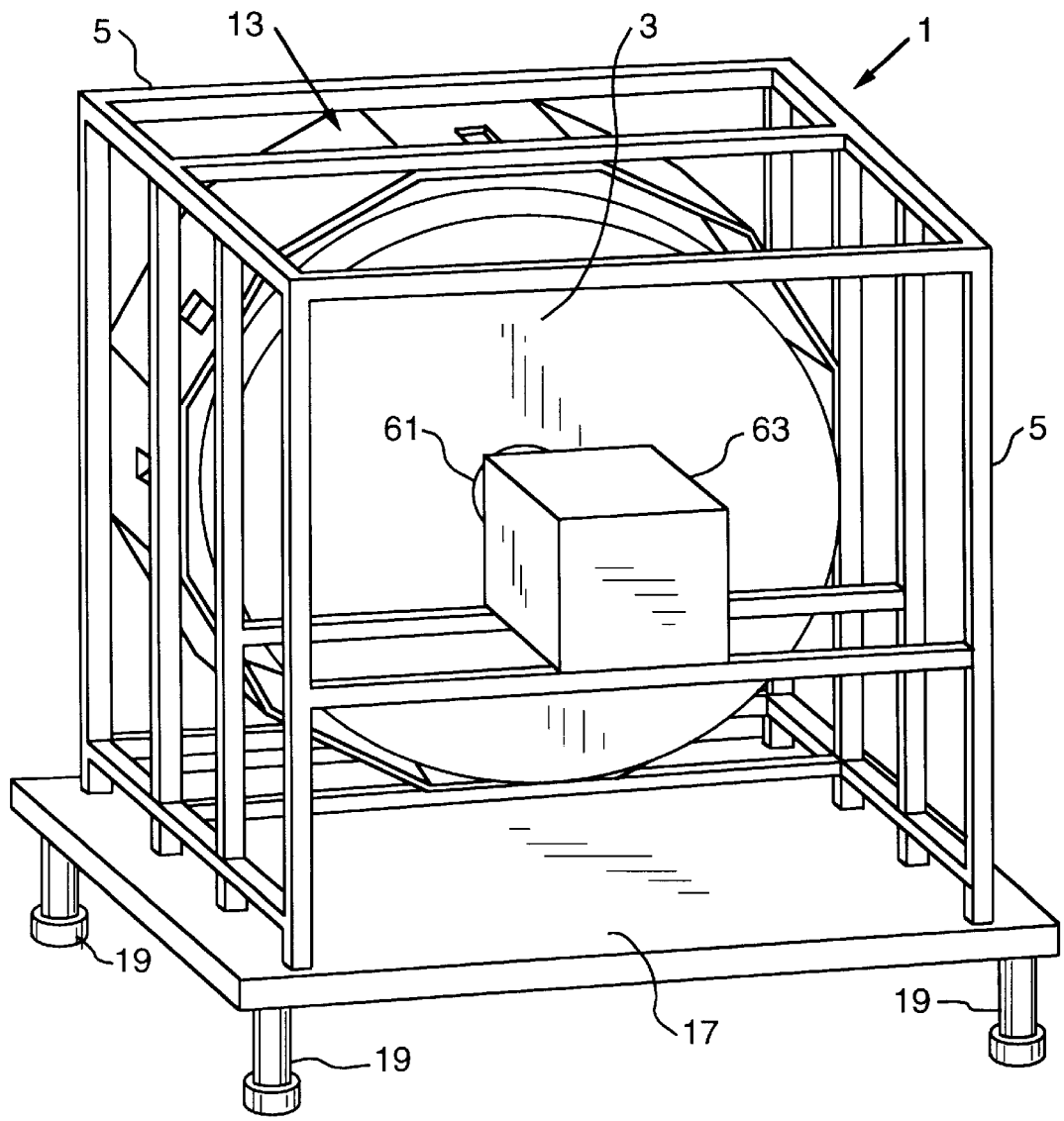
FIG. 5 is a schematic view from the rear of the machine of FIG. 4.

FIG. 1 illustrates a machine 1 of the present invention of a first embodiment having a indexing table 3 rotatable in a predetermined direction and housed in a frame 5 and mounted, by mounting bolts 7, on a fixed shaft 61 (FIG. 5) associated with an indexer 63 (FIG. 5). Indexing table 3 has a plurality of mandrels 9 mounted thereon for holding thermoplastic sleeves.

Adjacent each mandrel 9 on machine 1 is a manufacturing station 11, mounted on a mounting ring 13, for performing a process step on a sleeve mounted on each mandrel 9. The configuration of manufacturing stations 11 on mounting ring 13 comprises the manufacturing path. The manufacturing path is closed or endless because the first station in the path is adjacent to the last station in the path. All sleeves are transported around the manufacturing path by the indexing table 3. All manufacturing stations 11 of the manufacturing path may be connected to a PLC device 15, as shown by the dashed lines. Indexing table 3 rotates relative to the manufacturing stations 11. A base plate 17 with a plurality of leveling legs 19 supports frame 5. In another configuration, PLC device 15 may be housed on base plate 17.

There is shown in FIGS. 2 and 3 a schematic view of the relative lengths of a conventional process line (FIG. 2) which is between 80 and 100 feet long and an arrangement of three machines of the present invention, about 30 feet long in length associated with a common conveyor (FIG. 3). Each arrangement in FIGS. 2 and 3 includes one machine for extruding a hollow thermoplastic body and cutting the body into thermoplastic sleeves of equal lengths.

In the conventional manufacturing process, the thermoplastic sleeves travel along a path 80 to 100 feet in length where the sleeve is formed into a thermoplastic tube which can be decorated, sealed with protective material and capped. Conversely, with only a single machine used in a plant of the present invention, a thermoplastic sleeve is loaded onto the machine whereby it travels around a closed path only a few feet in length where the sleeve is formed into a thermoplastic tube which may also be decorated, protective sealed and capped on the same manufacturing path.

Referring to FIG. 2, the machine 21 for extruding, cooling and cutting thermoplastic sleeves is followed by a loading machine 23 which loads thermoplastic sleeves onto a transportation belt 25 which transports the sleeves to a machine 27 for forming a head on one end of the sleeves. The resulting headed thermoplastic sleeves, which are now considered as thermoplastic tubes, are transported by a system 29 to a printing machine 31 for decorating the exterior of the thermoplastic tubes. The decorated thermoplastic tubes are then transported by a conveyor 33 to a capping machine 35 where a cap is snapped or screwed onto the headed end of the thermoplastic tubes. Finally, the capped tube is unloaded from the process line by an unloader 37 and transported by a conveyor 39 to a packing machine 41, where the tubes are packed for shipment.

By comparison, an arrangement of three machines 43, 45 and 47 is shown in FIG. 3. The arrangement includes a machine 49 for extruding, cooling and cutting thermoplastic sleeves followed by a loading machine 51 for loading thermoplastic sleeves onto a conveyor system 53. The sleeves travel down conveyor system 53 where they are loaded onto one of the three machines 43, 45 and 47 by mechanical feeders 55, 57 and 59. Machines 43, 45 and 47 transport the sleeves around a closed path only a few feet in length where the sleeves are transformed from blank sleeves into finished thermoplastic tubes by the action of several manufacturing stations located around the closed path.

The machine used in the present invention uses significantly less sleeve and tube handling transfers compared to conventional tube manufacturing machines. This reduction, due in part to the compactness of the manufacturing path on the machine, improves efficiency and reduces the cost and time of the tube manufacturing process. In fact, the total time of manufacturing from resin pellet to finished tube is a few minutes as compared to at least a half an hour on conventional machinery. The machine of the present invention may be built to fit in a 4×4 foot area.

Figure 4:
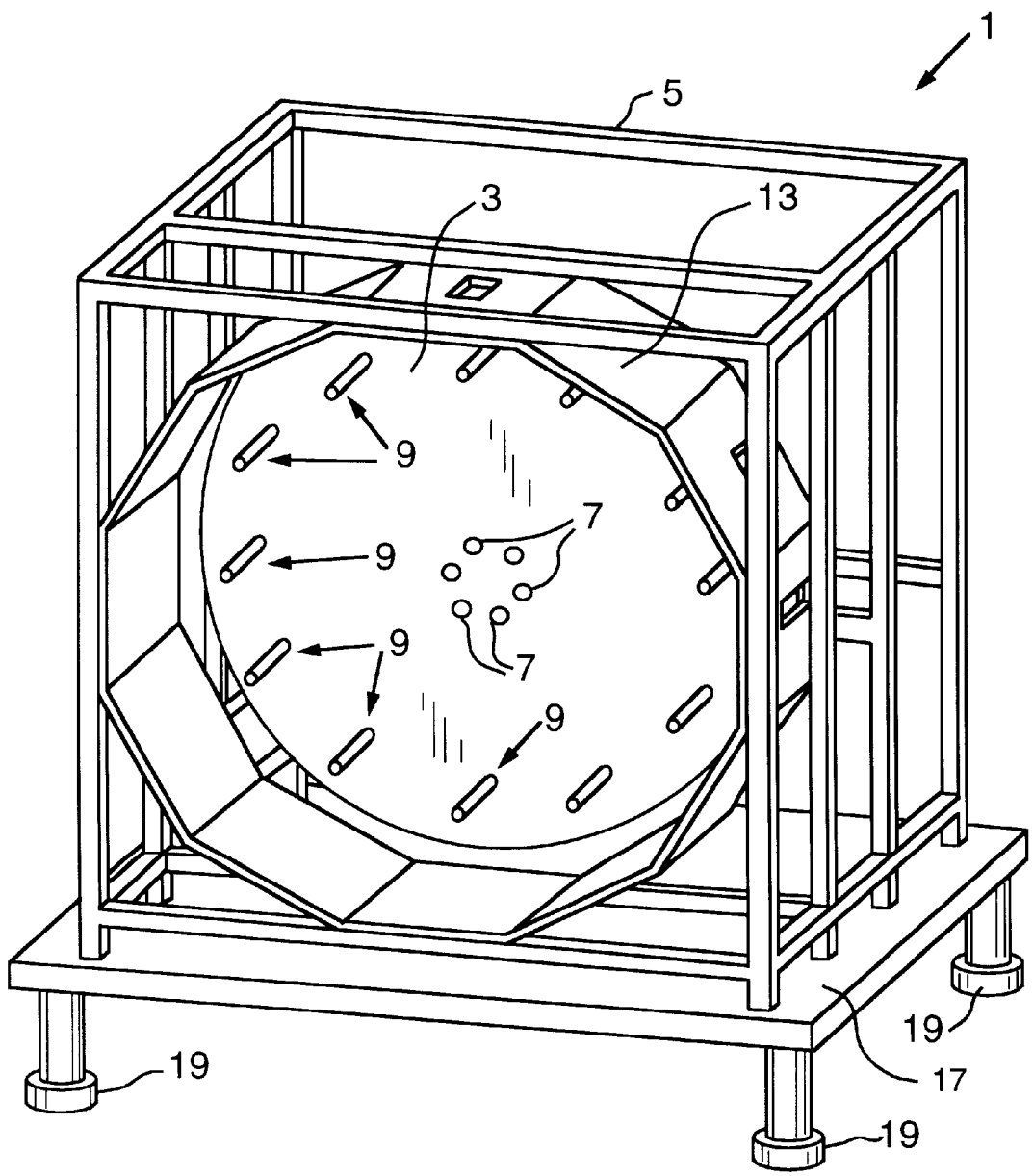
FIG. 4 is a schematic view of the machine of the first embodiment without the PLC device, shown only with an indexing table, holding mandrels, and a mounting ring for mounting manufacturing stations.

FIGS. 4–9 illustrate, in greater detail, machine 1 of the first embodiment that may be used as one of machines 43, 45 and 47 shown in arrangement in FIG. 3. FIG. 4 shows mandrels 9 of machine 1, shown without PLC device 15. Mandrels 9 are evenly spaced on indexing table 3. Indexing table 3 is typically a circular plate. While the preferred embodiment of indexing table 3 is an aluminum plate, indexing table 3 may be substituted by any other means which transports sleeves around a closed manufacturing path.

The manufacturing stations 11 of the closed manufacturing path (FIG. 1) are mounted and arranged on a support, such as mounting ring 13 (FIG. 4). Mounting ring 13 supports manufacturing stations 11 in a position such that manufacturing stations may perform a process step on a sleeve or tube on mandrel 9. In the embodiment in FIG. 1, mounting ring 13 supports manufacturing stations 11 so that they are adjacent to and in front of a corresponding mandrel 9. Alternatively, stations 11 could be mounted on a frame (not shown) in the same plane as indexing table 3 so that manufacturing stations are beside a corresponding mandrel 9.

FIG. 5 is a perspective view from the rear of machine 1 of FIG. 4, showing indexing table 3 connected to a shaft 61 rotatably mounted on an indexer 63. Indexer 63 may be conveniently mounted on frame 5.

Indexer 63 is a means for rotating or advancing indexing table 3 in a step-wise or incremental manner so that sleeves loaded onto mandrels 9 stop at each manufacturing station of the closed path for a time period long enough to effectuate a manufacturing process step. Indexing table 3, of this embodiment, rotates counterclockwise.

Figure 6:
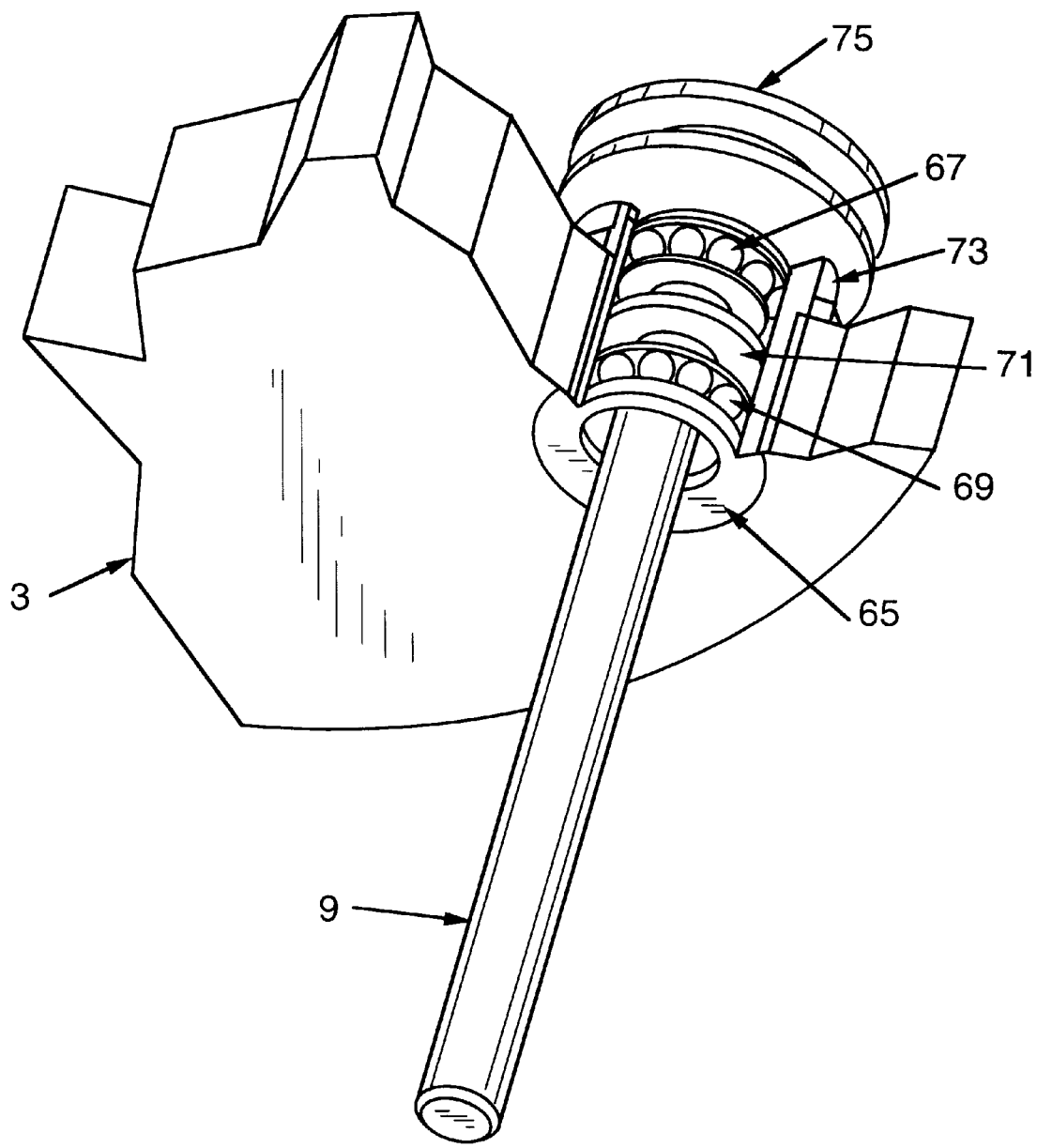
FIG. 6 is a schematic view of a housing for seating a holding mandrel in an indexing table.

FIG. 6 illustrates a housing assembly 65 for mandrel 9 on indexing table 3 of machine 1. Housing assembly 65 at the base of mandrel 9 allows mandrel 9 to rotate smoothly at various speeds, which is necessary for certain manufacturing steps. Inside housing assembly 65 are two rings 67 and 69 of ball bearings separated by a bearing spacer 71. A bearing clamp 73 is also added to housing assembly 65 for support. At one end of mandrel 9 is mounted a mandrel pulley 75 for improved weight distribution and a means to rotate mandrel 9. The desirable housing assembly 65 materials are durable materials, such as metal, because the components of housing assembly 65 wear.

Figure 7:
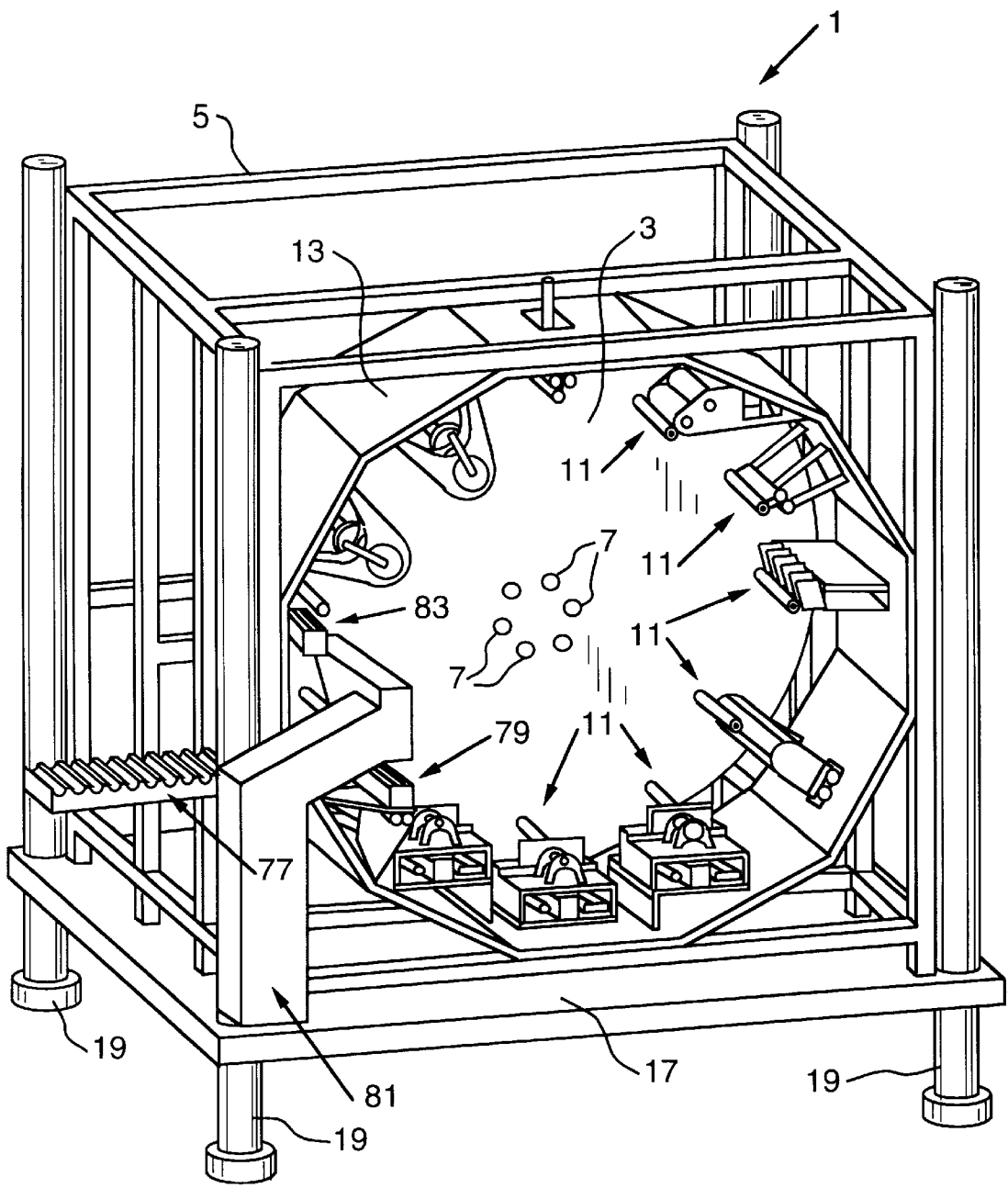
FIG. 7 is a schematic view of a machine of the first embodiment without the PLC device shown with supply and removal means.
Figure 8:
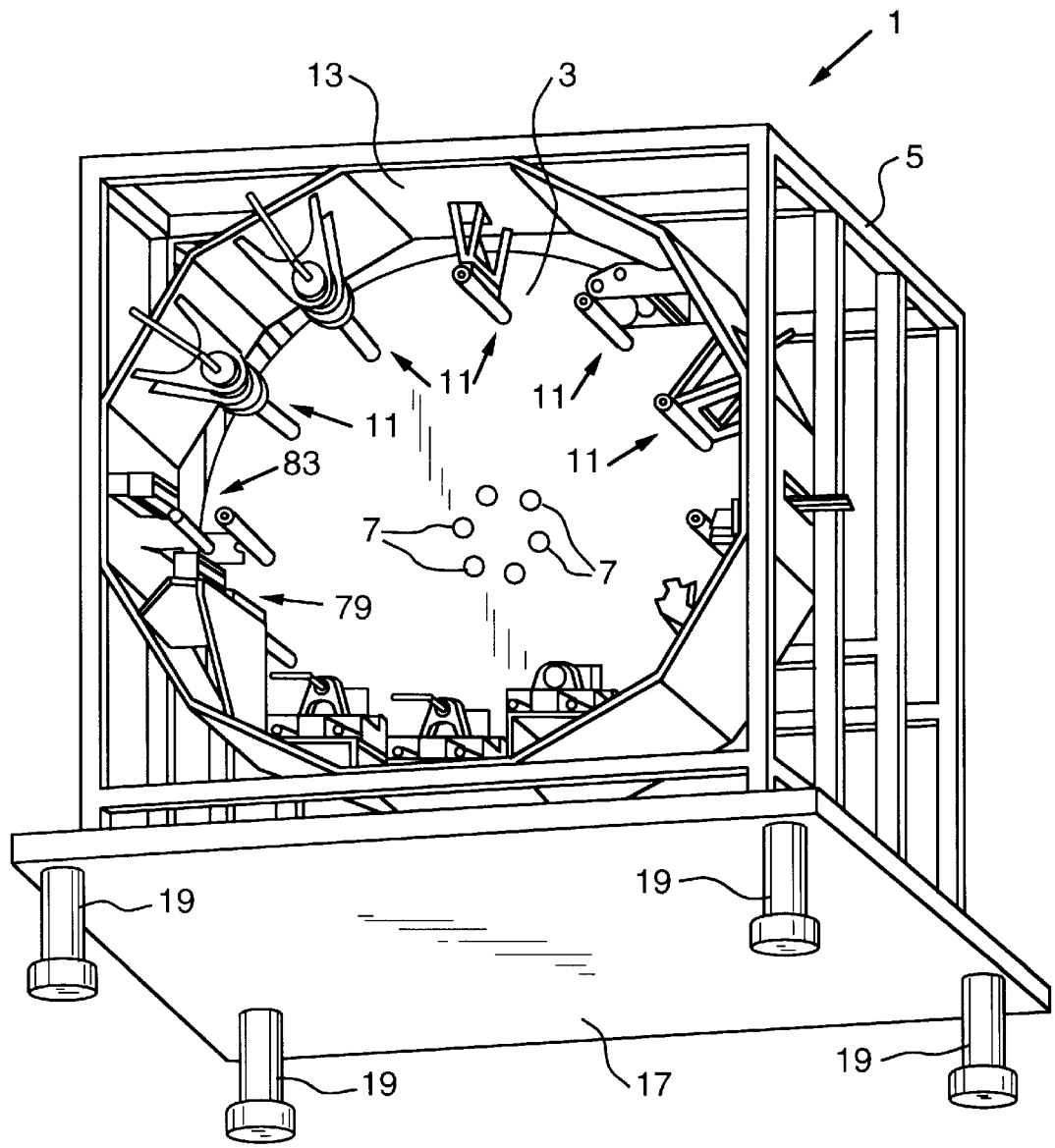
FIG. 8 is a schematic view of the machine of the first embodiment without the PLC device shown from a lower perspective.

FIGS. 7 and 8 show perspective views of machine 1. FIG. 7 shows machine 1 with pickle sorter 77 which supplies sleeves directly to load station 79. FIG. 7 also shows unload chute 81 which transports tubes from machine 1 that have been removed by unload station 83 from indexing table 3. FIG. 8 shows, in greater detail, the relative locations of load station 79, unload station 83 and the remaining manufacturing stations.

To make machine 1 operable, machine 1 must be connected to a power source and other additional input sources as necessary, such as compressed air, water, electricity, steam, heated air, etc. In additional to supplying sleeves to machine 1, other raw materials such as caps, formed heads, etc. may be necessary for the manufacturing process.

Figure 9:
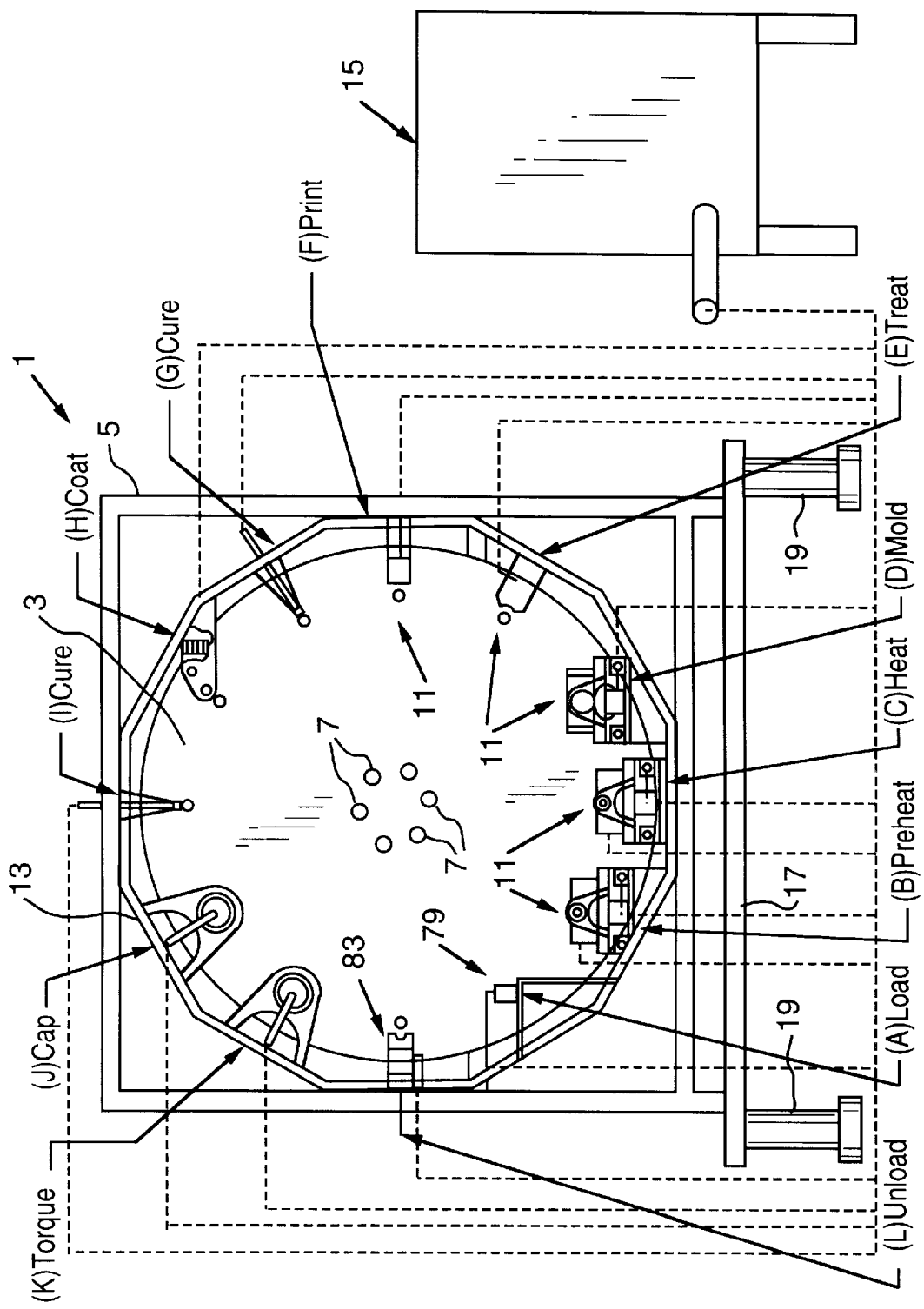
FIG. 9 is a schematic view of the machine of the first embodiment shown from the front with various stations identified.

FIG. 9 schematically shows the configuration of the 12 manufacturing stations 11 of machine 1, all connected to PLC device 15. The manufacturing stations and corresponding manufacturing process steps shown are: (A) load, (B) preheat, (C) heat, (D) mold, (E) treat, (F) print, (G) cure, (H) coat, (I) cure, (J) cap, (K) torque and (L) unload. An example of the preferred machine is shown and described in co-pending application "Machine for Manufacturing Thermoplastic Tubes" assigned to the assignee of the present invention and the contents of which are incorporated herein.

The minimum process steps necessary to form a tube from a sleeve are: loading the sleeve on the machine, forming a head on the sleeve, and unloading the headed sleeve. Besides the minimum steps, many other finishing or intermediate steps may be performed by additional manufacturing stations to produce a product of higher complexity. An example of the preferred method is shown and described in co-pending application "Method for Manufacturing Thermoplastic Tubes" assigned to the assignee of the present invention and the contents of which are incorporated herein.

Figure 10:
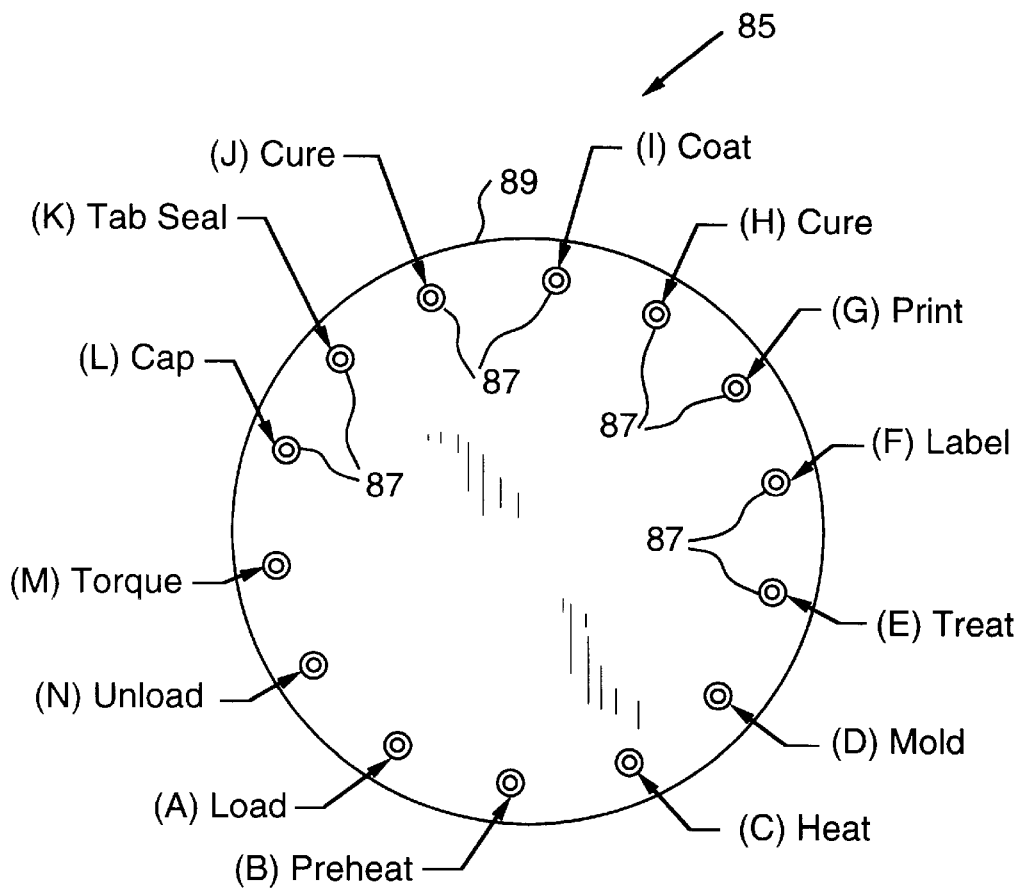
FIG. 10 shows the relative locations of fourteen different manufacturing stations located around the circumference of an indexing table, comprising a second embodiment of the machine used in the present invention.

For example, machine 85 a second embodiment of a machine used in the present invention represented schematically in FIG. 10, has 14 stations located adjacent to each of 14 mandrels 87 mounted on indexing table 89, which rotates counterclockwise via indexer 91 (FIG. 11) in this embodiment. The 14 different stations and corresponding process steps are as follows: (A) load, (B) preheat, (C) heat, (D) mold, (E) treat, (F) label, (G) print, (H) cure, (I) coat, (J) cure, (K) tab seal, (L) cap, (M) torque and (N) unload.

Figure 11:
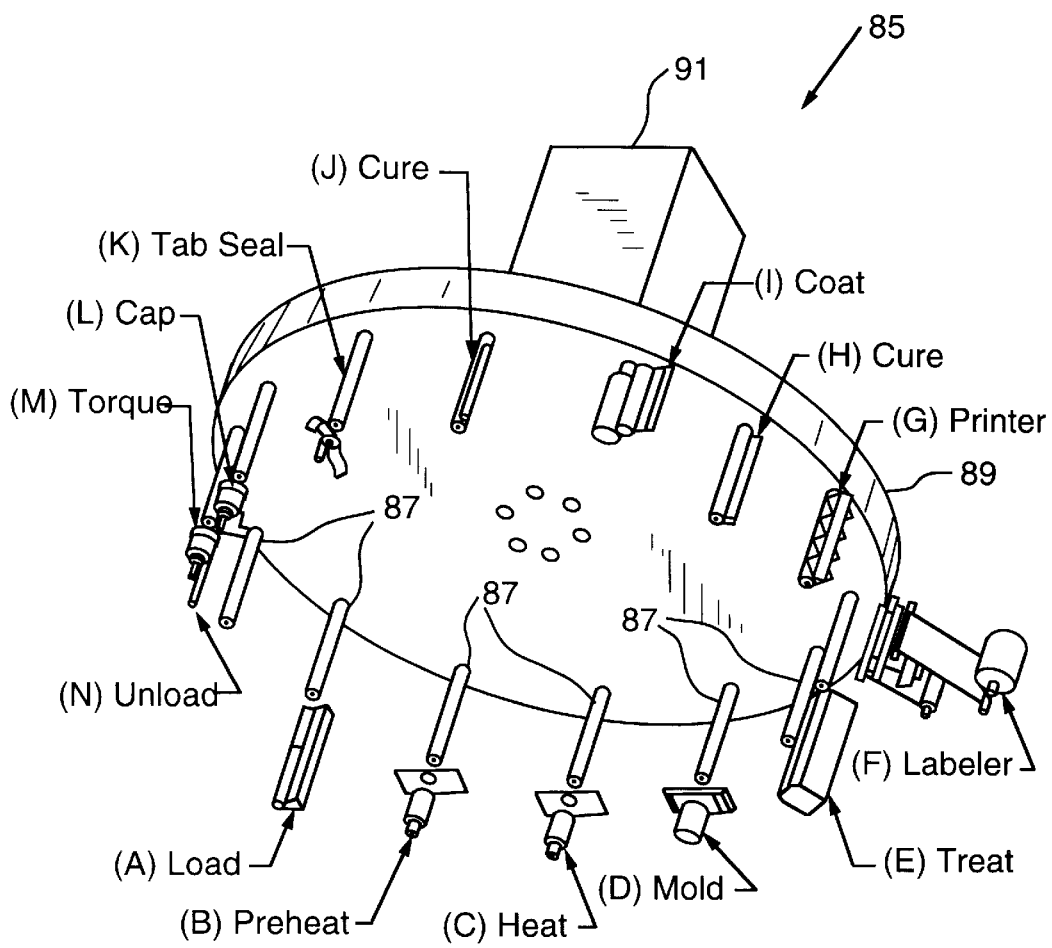
FIG. 11 is a schematic view of an indexing table and the fourteen manufacturing stations of FIG. 10.

FIG. 11 is a perspective view of machine 85 of FIG. 10, showing partial illustrations of manufacturing stations (A) through (N). Machine 85 has three different decorating stations, (F) label, (G) print and (I) coat. It is unlikely that a manufacturing process would employ all three stations. Typically, only one or two of the decorating stations would be operable. Non-operable stations may be turned off manually or by a PLC device or they may be removed.

A PLC device may be added to the machine used in the present invention for the purpose of controlling the entire machine including the various manufacturing stations. In conventional process lines some of the manufacturing equipment is PLC controlled. However machine feedback control to control all aspects of a manufacturing step, product quality control and product feedback control and total mechanical control over sleeves and tubes have not been feasible. Such PLC control is almost impossible in conventional processing lines because large processing lines handle several hundred thermoplastic articles at a time and there is no systematic method for keeping track of individual articles and controlling the same on the conventional machines.

FIG. 1 illustrates one embodiment of a machine used in the present invention, with each manufacturing station connected to a PLC device, as indicated by the dashed lines. The PLC device can perform a variety of functions: A PLC device may be employed to control, by turning on or turning off, each manufacturing station along a manufacturing path. A PLC device can control the inputs needed for each manufacturing station. For example, a PLC device can control the heating temperature of the preheat and heat stations. The PLC can control the speed of each manufacturing station and the speed of the entire manufacturing machine.

Process control for the machine used in the present invention involves controlling the operation of individual manufacturing stations alone or in combination with other manufacturing stations around the closed manufacturing path. The operation of the manufacturing stations may be based on information gathered from sensors obtaining information about the operation of each manufacturing station itself, sensors obtaining information about the quality of the thermoplastic tubes produced, or information obtained from both the operation of each of the manufacturing stations and the quality of the thermoplastic tubes produced. An example of the preferred process control method and PLC design is shown and described in co-pending application "Process Control Method for a Machine for Manufacturing Thermoplastic Tubes" assigned to the assignee of the present invention and the contents of which are incorporated herein.

Figure 12:
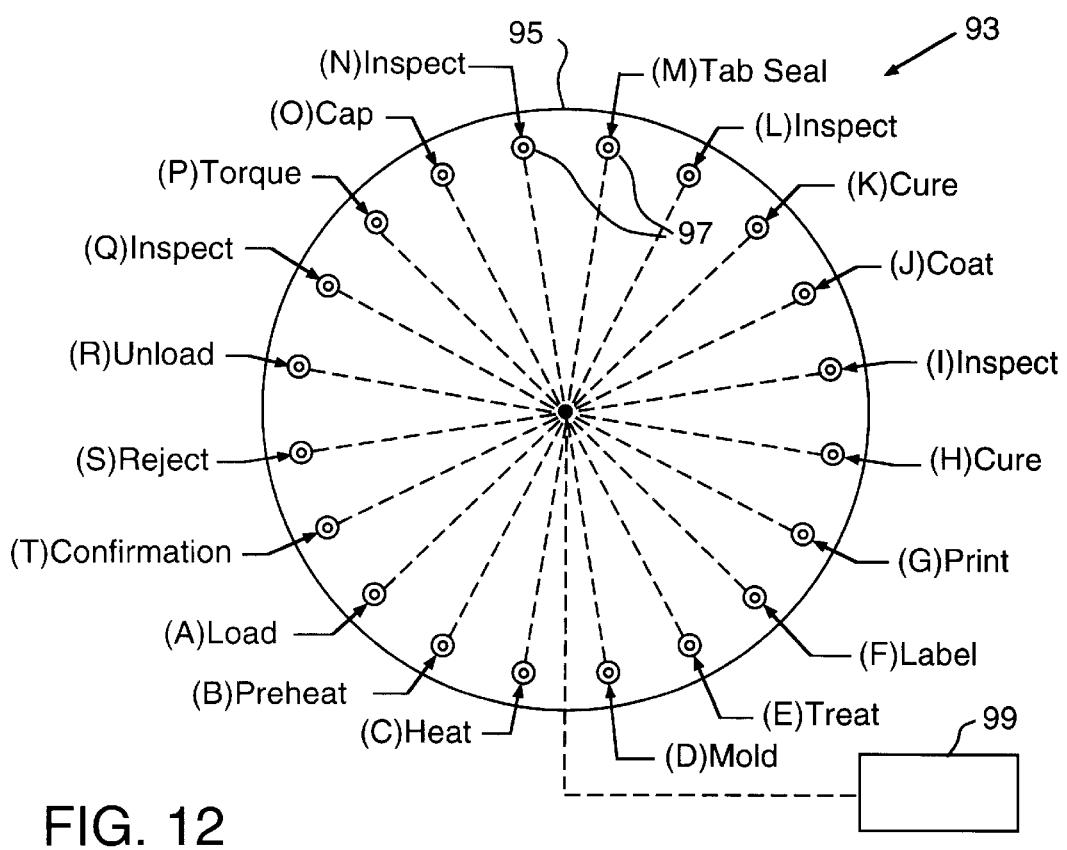
FIG. 12 shows the locations of twenty manufacturing stations along the edge of an indexing table, with each manufacturing station associated with a PLC device, which is a third embodiment of the machine used in the present invention.

FIG. 12 illustrates a third embodiment of a machine 93 used in the plant of the present invention having indexing table 95, 20 separate mandrels 97 for holding thermoplastic articles and 20 different manufacturing stations labelled (A) through (T), all operably associated with a PLC device 99. The 20 different stations and corresponding process steps of this embodiment are as follows: (A) load, (B) preheat, (C) heat, (D) mold, (E) treatment, (F) label, (G) print, (H) cure, (I) inspect, (J) coat, (K) cure, (L) inspect, (M) tab seal, (N) inspect, (O) cap, (P) torque, (Q) inspect, (R) unload, (S) reject and (T) confirmation. Machine 93 is capable of manufacturing thermoplastic tubes that are inspected for product quality because the manufacturing path includes inspection station (I), (L), (N) and (Q) which inspect product quality and are controlled by PLC device 99.

Figure 13:
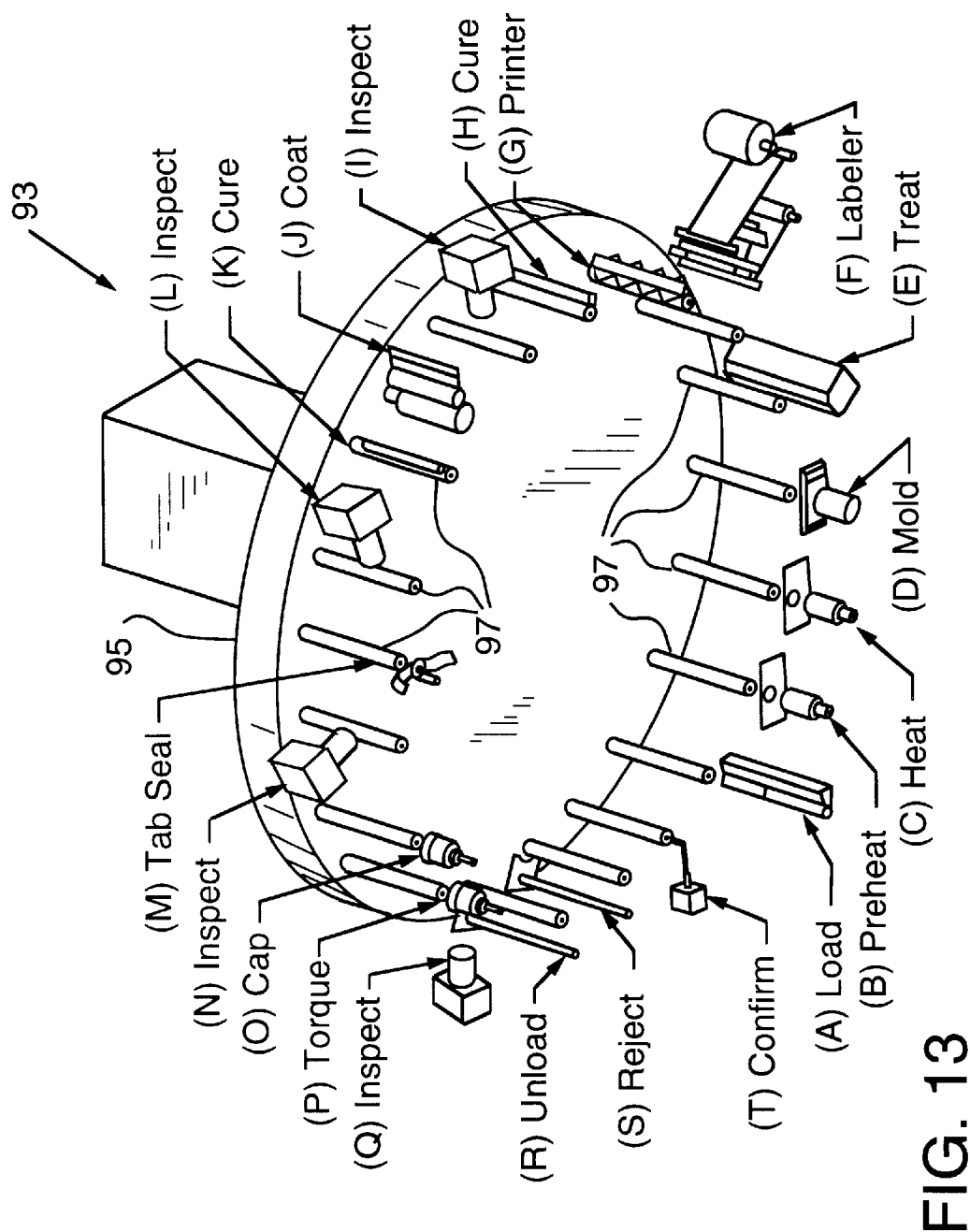
FIG. 13 is a schematic view of the twenty manufacturing stations of FIG. 12.

FIG. 13 is a perspective view of the machine 93 represented in FIG. 12, shown without a support frame and PLC device, illustrating indexing table 95 having 20 different mandrels 97 mounted thereon as well as 20 different stations labelled (A) through (T). The manufacturing stations depicted are only partial views showing just the main components of each station. Stations (A) through (T) are in the same order as the stations illustrated in FIG. 12.

In addition to adding sensors (not shown) to every station in the processing path of the machine 93 of the third embodiment, some additional stations have been added as compared with machine 85. For example, inspection stations (I), (L), (N) and (Q) have been added at different locations along the closed manufacturing path. Inspection stations (I), (L), (N) and (Q) are for the purpose of inspecting the quality of the thermoplastic article during the manufacturing process. Inspection is made possible by the aid of PLC device 99.

Also provided on machine 93 schematically represented in FIG. 13 is reject station (S). Reject station (S) is similar to the unload station (N) of the machine 85 of the second embodiment represented in FIG. 10. Reject station (S) is for the purpose of unloading defective products. Another station added to the machine 93 represented in FIG. 13, is the final confirmation station (T). Confirmation station (T) is for the purpose of confirming that a thermoplastic tube has been removed either by unload station (R) or reject station (S) from mandrel 97. This is another example of how a PLC device and a machine used in the present invention provides for less waste and more accuracy in the manufacturing process.

As shown by the previous illustrations, many combinations and variations of the machines used in the present invention are possible.

II. Arrangement of Machines into a Production Cell

To create a manufacturing and packing plant of the present invention, at least one thermoplastic tube manufacturing machine is combined with the following in an arrangement called a "production cell": at least one extrusion machine; at least one sleeve conveyor; at least one tube transportation means; and at least one packing machine. At least one production cell is combined with a product transportation line to create a manufacturing plant.

When the machines are arranged in small groups or "production cells," space, labor and raw material input can be saved. One production cell of the preferred embodiment contains six manufacturing machines each of which can manufacture headed, sealed, capped and decorated tubes from thermoplastic sleeves. A single cell has a total output equivalent to a single conventional process line.

Figure 14:
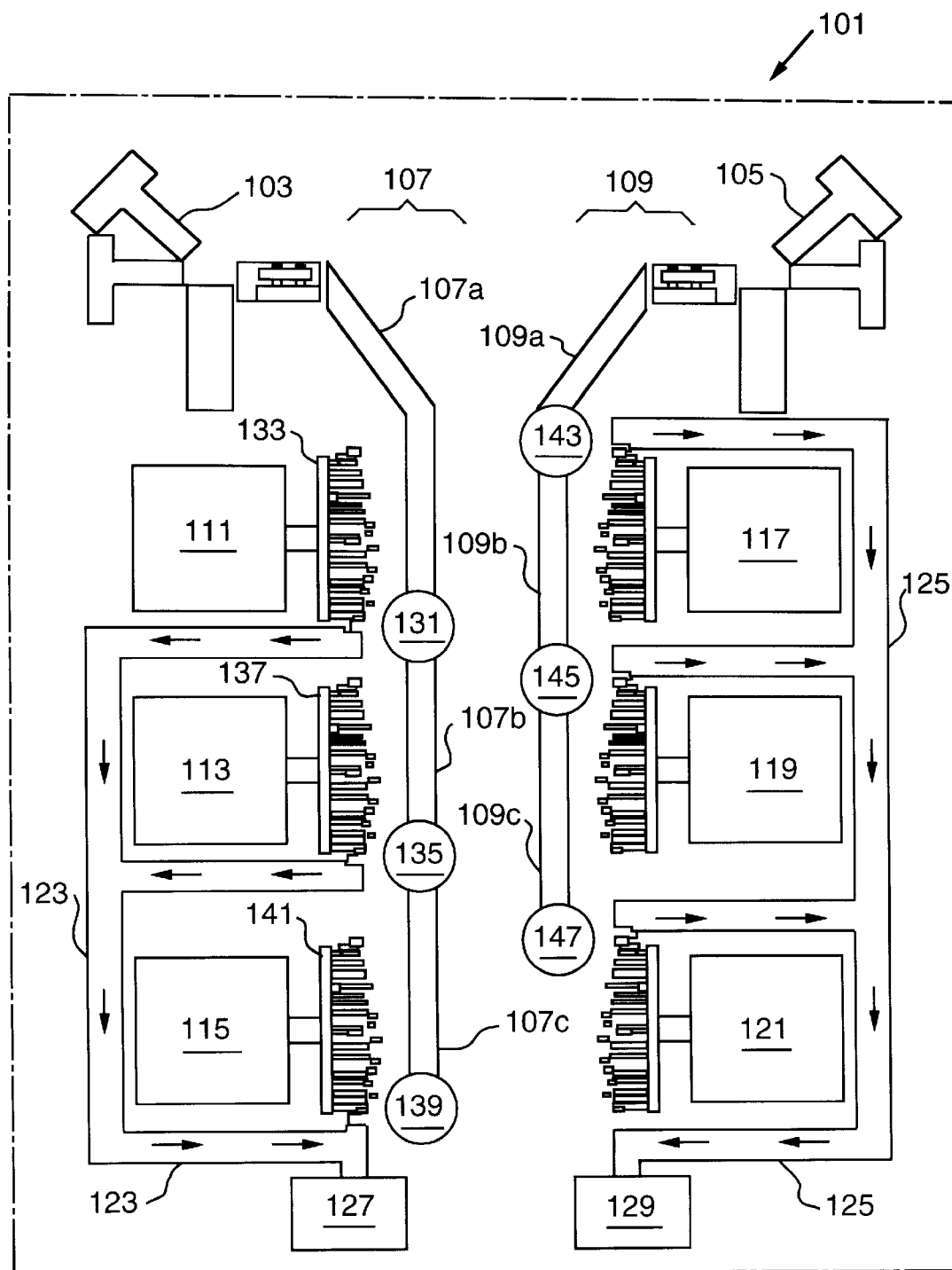
FIG. 14 is a schematic view of one production cell of a manufacturing and packing plant of the present invention.

In each cell there is an arrangement of extrusion machines, conveyors, manufacturing machines, and automatic packing machines. FIG. 14 is an example of a manufacturing production cell 101 of the preferred embodiment. Production cell 101 contains two extrusion machines 103 and 105 each associated with a sleeve conveyor 107 and 109, each of which are further associated with three manufacturing machines 111, 113, 115, and 117, 119, 121 respectively. The manufacturing machines 111–115 are associated with tube conveyor 123 and machines 117–121 are associated with tube conveyor 125. Tube conveyors 123 and 125 send the finished tubes to packing machines 127 and 129 respectively. Alternatively, instead of tube conveyors the finished tubes may be manually transported to packing machines 127 and 129.

The operational flow of materials on the left half of production cell 101 of FIG. 14 is as follows: Extrusion machine 103 can extrude a thermoplastic hollow body which is then cooled and cut to any desired size to form sleeves of a discrete size made from the hollow body. Preferably, the thermoplastic hollow body is a longitudinally stretched, extruded cylinder. The sleeves then are automatically dropped onto a first section 107a of sleeve conveyor 107, which takes the sleeves from extrusion machine 103 to a first mechanical feeder 131.

First feeder 131 is a mechanical device which feeds thermoplastic sleeves into the load station, like load station 79 of FIG. 7, of the manufacturing machine, in this case machine 111. The thermoplastic sleeve is then loaded by a load station onto indexing table 133 of manufacturing machine 111 where it advances around a closed manufacturing path and is formed into a tube. At the final unload station, like unload station 83 of FIG. 7, the tube is removed and transported by tube conveyor 123 to automatic packing machine 127.

Extrusion machine 103 can create sleeves at a quantity and rate to supply three continuously operating manufacturing machines 111–115. In this case, all of the sleeves travel on the first section 107a of sleeve conveyor 107 to feed the first feeder 131. The first feeder 131 will be the first feeder to reach full operating capacity. First feeder 131 is kept operating at full capacity by the influx of sleeves from the first section 107a of sleeve conveyor 107.

When first feeder 131 is operating at full capacity the excess sleeves on the first section 107a will be diverted to a second section 107b of sleeve conveyor 107. The sleeves will travel to a second feeder 135 where they will be loaded onto indexing table 137 of manufacturing machine 113 by a load station. Just the same as on machine 111, the sleeves are transported around a closed manufacturing path until they are formed into tubes whereby they will be removed and transported by tube conveyor 123 to automatic packing machine 127.

Just like first feeder 131, when second feeder 135 is operating at full capacity, the excess sleeves on the second section 107b of sleeve conveyor 107 will be diverted to a third section 107c. These remaining sleeves will be transported to a third feeder 139 where the tubes will be loaded onto an indexing table 141 of manufacturing machine 115. Again, just as in the previous two manufacturing machines 111 and 113, the sleeves travel around a closed path whereby the manufacturing process will be completed and the tubes will be removed.

The right hand side of the production cell 101 shown in FIG. 14 operates in the same manner as the left side previously described. Extrusion machine 105 is associated with the first section 109a of sleeve conveyor 109. Directly associated with the first section 109a is a first feeder 143. When first feeder 143 is operating at full capacity the excess sleeves produced from extrusion machine 105 are diverted to a second section 109b of sleeve conveyor 109. Second section 109b is associated with a second feeder 145 and a third section 109c of sleeve conveyor 109 which is finally associated with a third feeder 147. First feeder 143 feeds manufacturing machine 117 and second feeder 145 feeds manufacturing machine 119. Again, when mechanical feeder 145 is operating at full capacity, the excess sleeves from extrusion machine 105 are diverted to third section 109c of sleeve conveyor 109 to third feeder 147.

All of the sleeves loaded onto manufacturing machines 117–121 travel around a closed manufacturing path where they are formed into tubes. The tubes are then unloaded from each machine and transported by tube conveyor 125 to automatic packing machine 129.

In order to make the cell compact, manufacturing machines 111–121 are preferably arranged facing each other on the left and right sides of production cell 101. Thus, there are three manufacturing machines on each side of production cell 101, being one embodiment of a production cell. The manufacturing machines 111–115 and 117–121 on each side are arranged in a linear relationship with each machine facing toward sleeve conveyors 107 and 109 supplying sleeves.

A production cell typically contains manufacturing machines that are alike in the process method. Additionally, production cells have preferably the same approximate size. Same size production cells are appropriate for an orderly arranged manufacturing plant of the present invention.

The division of labor in production cell 101, as in FIG. 14, would, in principle, be two workers for manufacturing machines 111–121 and one worker for the two extrusion machines 103 and 105. Of the three workers in a cell, only one needs to be technically skilled. The six manufacturing machines 111–121 only require two workers to monitor and maintain the operation of the same. Two workers are sufficient to correct problems that may arise with the six mechanical feeders 131, 135, 139, 143, 145, and 147, load and unload stations of each manufacturing machine and the conveyors connecting the machines 107, 109, 123 and 125. For example, the two workers may be required to correct jams in the flow of sleeves along the conveyors. It is the loading, unloading and transportation of sleeves and tubes which typically requires the most labor. Jams frequently occur in the flow of articles along conveyor belts and therefore a person is needed to remove these jams to keep the sleeves and tubes continuously flowing.

One worker can monitor and maintain the operation of more than two thermoplastic extrusion machines. One worker can be used to monitor and maintain the operation of extrusion machines 103 and 105, however this worker need not be present to monitor operation of these machines continuously. Extrusion machines 103 and 105 typically have a high efficiency.

The estimated area of the cell of FIG. 14 is 20 feet wide by 24 feet long. The estimated output of one cell having six manufacturing machines as shown in FIG. 14, is 120 tubes/min which is equivalent to the 100 to 150 tubes/min that are manufactured on a conventional process line. Each manufacturing machine would produce approximately 20 tubes/min which means 60 tubes/minute would be the finished product output from each extrusion machine. The manufacturing stations of the machines are more reliable, i.e) more efficient than the corresponding machines on a conventional process line, because the manufacturing rate of a single machine is slower, 20 tubes/min, as compared to the manufacturing rate of the entire conventional process line which is approximately 120 tubes/min. The total annual output of one production cell having six manufacturing machines and 2.5 laborers would be 50 million tubes based on 7 day continuous operation.

Figure 15:
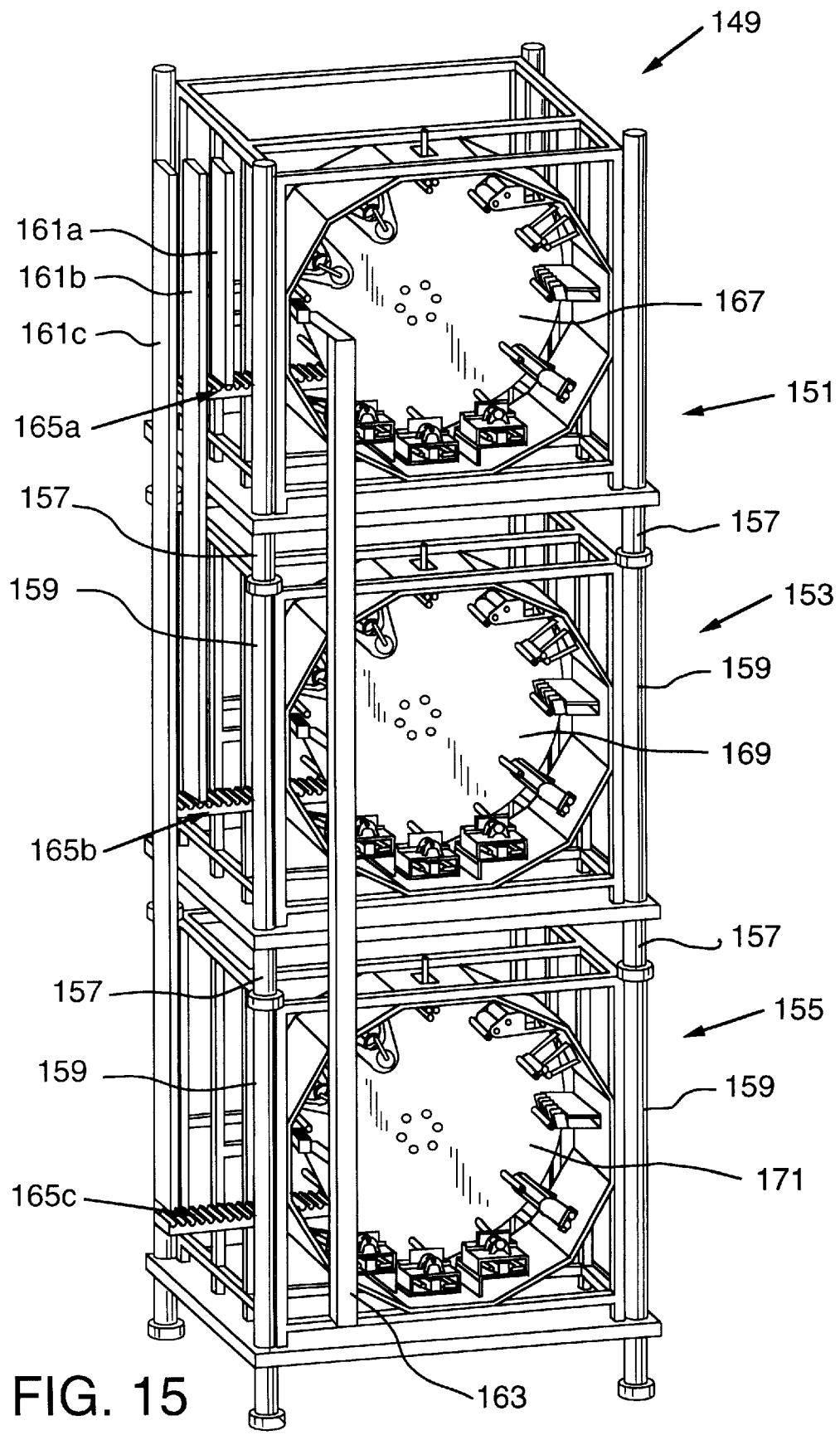
FIG. 15 is a perspective view of three machines of the present invention stacked vertically.

In stead of arranging manufacturing machines 111–115 and 117–121 horizontally, they can be stacked vertically in a tower 149, as shown in FIG. 15, to conserve more floor space. FIG. 15 illustrates three 12 mandrel machines 151, 153 and 155 stacked vertically by connecting leveling legs 157 of a machine on top, such as machine 151, with support posts 159 of a machine on bottom, such as machine 153. This arrangement creates a very compact production cell.

Figure 17:
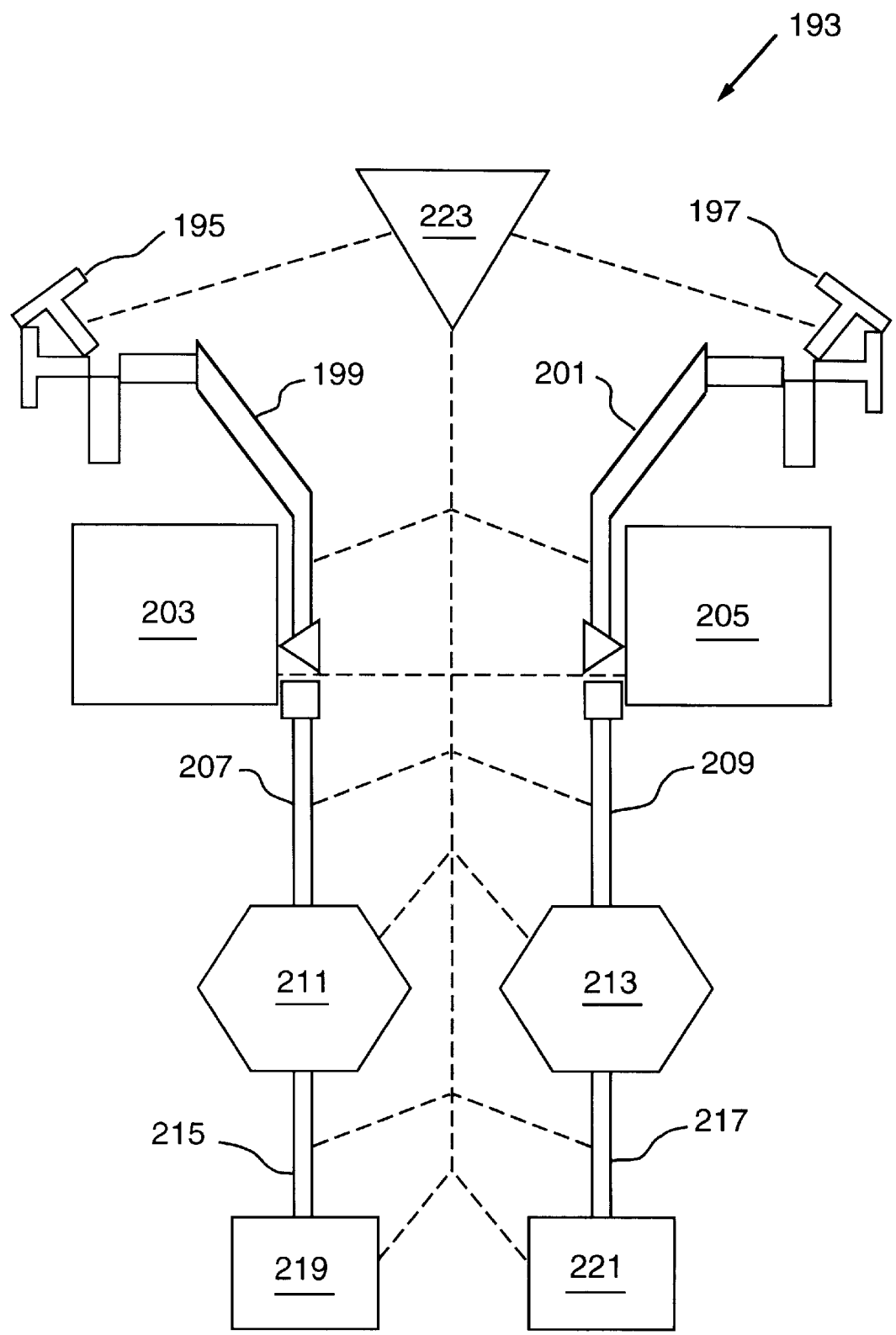
FIG. 17 is a schematic view of one production cell of a manufacturing and packing plant of the present invention with two extruders, two sleeve conveyors; two towers of vertically stacked manufacturing machines, two tube conveyors; two filling machines; two transportation means and two packing machines; all connected to a common PLC device.

Vertically stacked manufacturing machines 151–155 are associated with both sleeve conveyors and tube conveyors. In tower 149 illustrated in FIG. 15, machines 151, 153 and 155 are associated with three sleeve conveyors 161 *a, b, c,* and a common tube conveyor 163, all of which are a chutes, for the feeding and removal of thermoplastic articles from machines 151–155. Sleeve conveyors 161 *a, b, c* transport sleeves to respective pickle sorters 165 *a, b, c* for supplying a load station (not shown) on each machine 151–155 with sleeves. Sleeves loaded onto indexing table 167, 169 and 171 of machines 151, 153 and 155, respectively, advance around a closed manufacturing path and are unloaded by an unload station (not shown) into tube conveyor 163 which transports tubes to a subsequent machine in the manufacturing plant of the present invention. Each machine 151, 153 and 155 can each be connected to a PLC device as shown in FIG. 1 or one common PLC device (FIG. 17).

Figure 16:
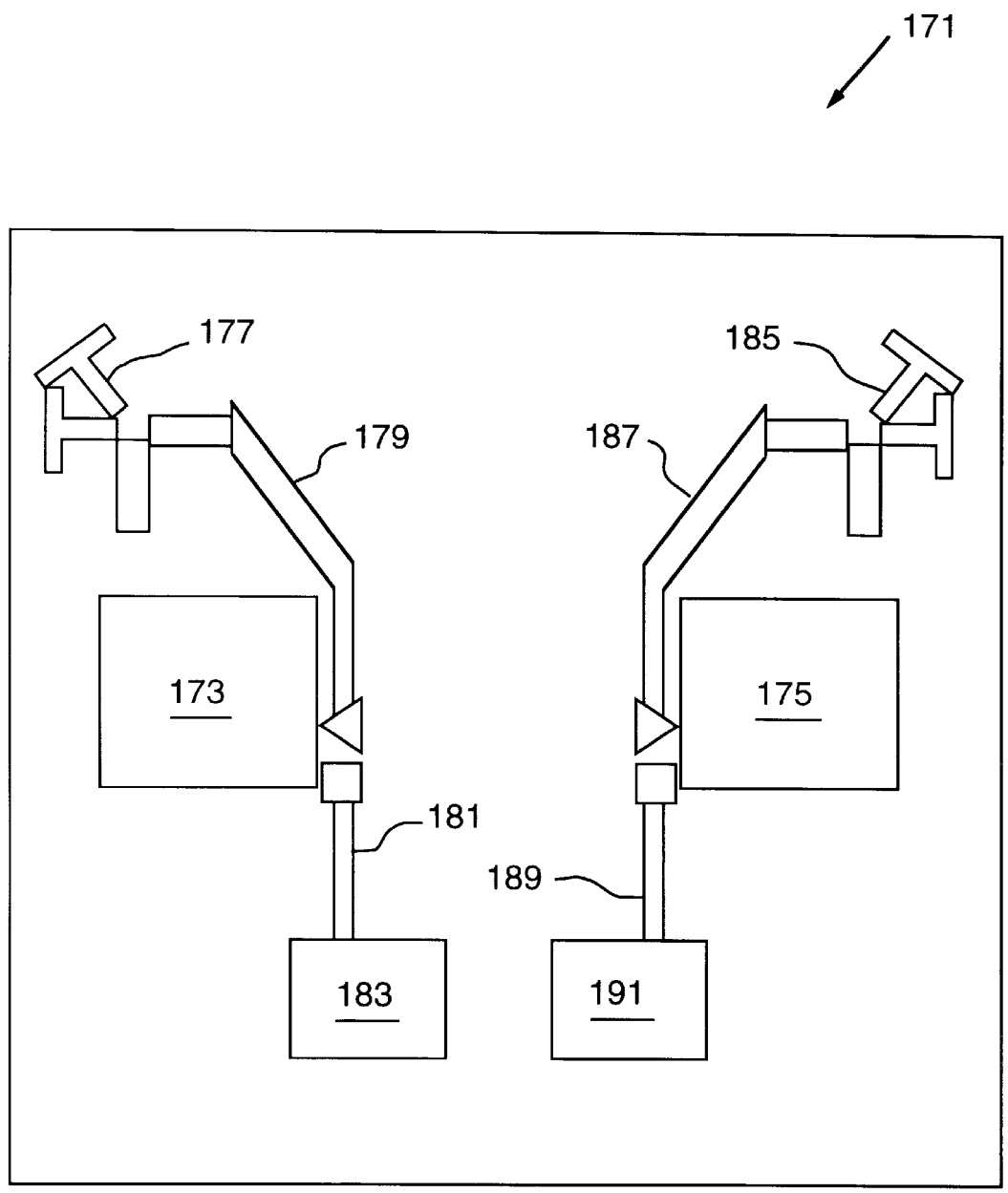
FIG. 16 is a schematic view of one production cell of a manufacturing and packing plant of the present invention using machines of the present invention stacked vertically.

FIG. 16 shows one embodiment of a production cell 171 with towers 173 and 175 each having three manufacturing machines. Tower 173 is supplied with thermoplastic sleeves by extrusion machine 177 by associated sleeve conveyor 179. Tubes formed from sleeves on tower 173 are removed and transported by tube conveyor 181 to packing machine 183. Tower 175 is associated with extrusion machine 185, sleeve conveyor 187, tube conveyor 189, and packing machine 191 like tower 173. The flow of materials to and from towers 173 and 175, in this embodiment, is the same as the material flow shown and described in FIG. 15.

Each tower may be monitored and maintained, in principle, by one worker. Therefore the production cell would require one worker for each tower and one worker to monitor both extrusion machines. One worker can ideally monitor up to four extrusion machines.

The layout of FIG. 16 depicts a two tower cell with all manufacturing machines in each tower 173 and 175 facing the same way and both towers 173 and 175 facing each other. A production cell could be arranged with two towers in a line or in a corner arrangement. A production cell may also have more than one tower. It could have four towers, two towers to each extrusion machine and two manufacturing machines to each tower. Thus a production cell can have manufacturing machines arranged horizontally and stacked vertically.

The tower arrangement is preferable for machines having simple manufacturing paths. The smaller and less complex the manufacturing path, the smaller the overall dimensions of the manufacturing machine. With manufacturing machines of simple design, the total height of a tower of three machines may be in the range of 6 to 9 feet. Towers ideally have from two to four manufacturing machines.

In addition to extrusion machines, sleeve conveyors, tube transportation means and packing machines, any previously described production cell can include at least one filling machine for filling formed tubes with contents. The filling machine must be located downstream the machine for manufacturing tubes. It is typically associated with such machine by a conveyor so manufactured tubes can be transported to a filling machine for injecting contents into an open end of the tubes. Once tubes are filled with contents, the filled tubes are sealed and transported to a packing machine. Thermoplastic tubes are preferably heat sealed but may be sealed by any know method. A production cell with one or more filling machines is ideal for a plant for manufacturing, filling and packing tubes for the pharmaceutical industry. Filling and sealing tubes on site is desirable in the pharmaceutical industry.

FIG. 17 illustrates a production cell 193, similar to production cell 171 of FIG. 16, with two extrusion machines 195 and 197 supplying two sleeve conveyors 199 and 201 which feed two towers 203 and 205 of three manufacturing machines each. Tubes are manufactured from sleeves on towers 203 and 205 after which the tubes are removed and transported by conveyors 207 and 209 to filling machines 211 and 213 respectively. Filling machines 211 and 213 fill the tubes with contents and seal the tubes before the tubes are transported by conveyors 215 and 217 to packing machines 219 and 221 respectively. All of the machines and conveyors mentioned above are operably associated with PLC device 223 as shown by the dashed lines.

III. Manufacturing and Packing Plant of the Present Invention

Figure 18:
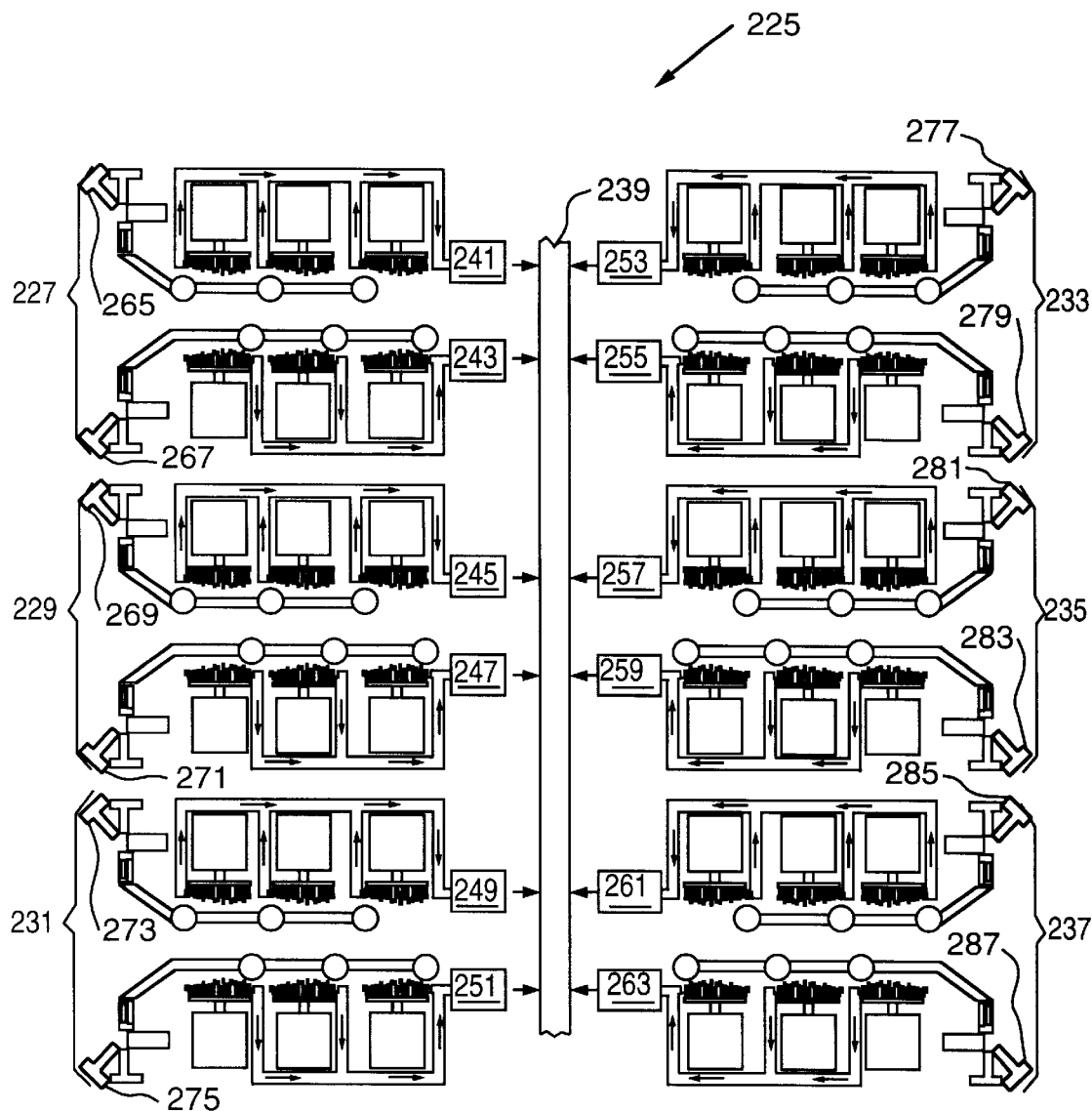
FIG. 18 is a schematic view of a first embodiment of a plant of the present invention having 6 production cells.

A manufacturing plant of the present invention has at least one production cell and a common product transportation line. Shown in FIG. 18 is a first embodiment of a manufacturing plant 225 of the present invention. This manufacturing plant has six production cells 227, 229, 231, 233, 235 and 237. All production cells 227–237, of this embodiment, are the same as production cell 101 of FIG. 14, with the same shapes representing the same features as FIG. 14.

Each production cell 227–237 is preferably the same size as the others. The preferred layout for six production cells 227–237 is to place three production cells 233–237 side by side all aligned in the same orientation on the right side of the common product transportation line 239 and three production cells 227–231 of the left side. The production cells 233–237 are a mirror image of production cells 227–231.

Common product transportation line 239 may be one single continuous conveyor or it may be a track along which robotic transportation machines are driven. In the event that common product transportation line 239 uses robotic transport vehicles (not shown), these vehicles are preferably equipped with flexible laser steering means so that no tracks need be laid out in the floor. Also the overtaking of the vehicles, (not shown) is not restricted to shunts between the tracks but may occur everywhere. Such a robotic transportation system may be designed in a double loop fashion so that there are continuously circulating transportation vehicles.

The operational flow of material in each production cell 227–237 is the same as that described for production cell 101 of FIG. 14. After the tubes are packed by the 12 packing machines 241, 243, 245, 247, 249, 251, 253, 255, 257, 259, 261, and 263 of plant 225 they are transported to common product transportation line 239 where they are removed from plant 225 or stored in inventory.

The entire number of workers needed to fill the manufacturing plant 225 in FIG. 18, in principle, is 16. Two workers in each production cell 227–237 monitor and maintain the six manufacturing machines of each production cell 227–237. Only two additional workers are needed on each of the left and right side of manufacturing plant 225 to supply all 12 extrusion machines 265, 267, 269, 271, 273, 275, 277, 279, 281, 283, 285, and 287 with raw material and to monitor and maintain the same.

The cells 227–237 of the first embodiment of a plant of the present invention preferably have similar dimensions so that the manufacturing plant 225 has a compact shape and area. If all six manufacturing machines of each cell 227–237 utilize a different manufacturing method, then the plant 225 has the capacity for six different manufacturing methods at one time. An advantage of the arrangement of manufacturing machines into production cells 227–237 associated with the common product transportation line 239, as in FIG. 18, is that if one machine in a production cell has to be shut down, the entire production cell need not be shut down. Instead the remaining 5 machines in the production cell will continue to operate and manufacture tubes which are sent to the packing machines and eventually to the common product transportation line 239. When one machine or conveyor system in a conventional process line (FIG. 2) malfunctions, the entire line must be shut down. However if one manufacturing station on one machine used in the present invention malfunctions, at most the machine is shut down but the remaining 5 machines in the production cell continue to operate. The output loss is therefor only one fifth the loss when a conventional process line is shut down.

Figure 19:
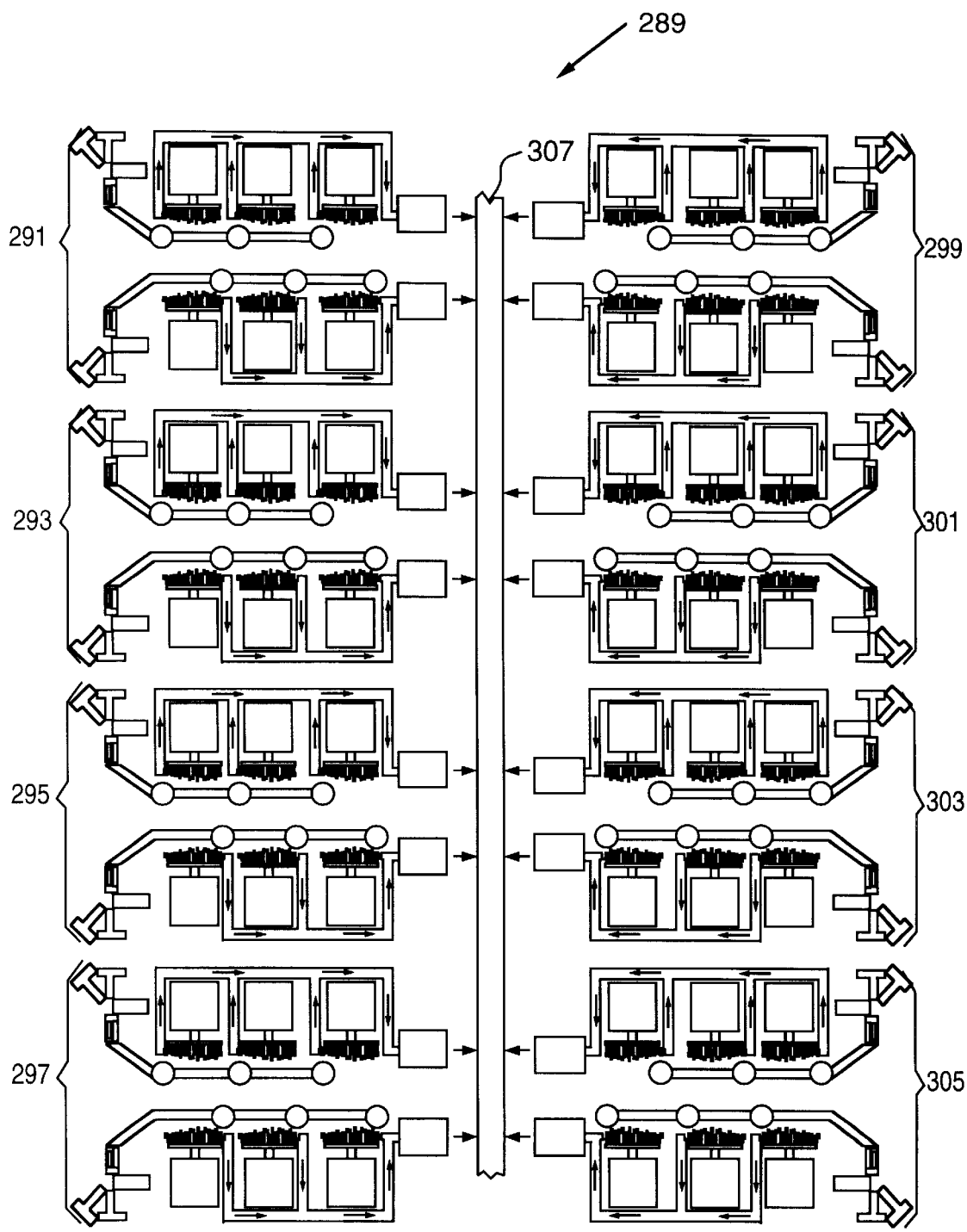
FIG. 19 is a schematic view of a second embodiment of a plant of the present invention having 8 production cells.

FIG. 19 shows a second embodiment of a plant 289 for manufacturing and packing thermoplastic tubes. The plant 289 has 8 production cells 291, 293, 295, 297, 299, 301, 303, and 305 arranged in groups of 4 on opposite sides of a common product transportation line 307. Again, all production cells 291–303 are the same as production cell 101 of FIG. 14. The advantage of plant 289 of a second embodiment over plant 225 of a first embodiment is that additional labor savings are achieved. Only 20 workers would needed to operate plant 289, 16 workers maintaining 48 manufacturing machines and 4 workers operating 16 extrusion machines. A similar tube capacity manufacturing plant which would have 8 conventional process lines requires at least 4 workers per line for a total of 32 workers. The plant 289 of the present invention would, in principle, require 12 less workers which is a considerable labor and capital savings.

Each of the production cells 291–305 around common product transportation line 239 forming manufacturing plant 289 of the second embodiment operate in the same manner as production cells 227–237 of manufacturing plant 225 of the first embodiment, shown in FIG. 18. In addition to the two embodiments of the manufacturing plants shown and described, additional embodiments having an arrangement of more or less production cells are possible. For example a plant for manufacturing and packing thermoplastic tubes having only 4 production cells arranged around a common product transportation line is possible as well as a plant having 12, 14, 18, 20 etc. production cells.

With production cells having vertically arranged towers of manufacturing machines, "mini" plants are possible. The tower arrangement allows for a significant reduction in floor space making plants using towers miniature manufacturing facilities as compared to manufacturing plants using conventional process lines.

Because the manufacturing plant of the present invention may be collapsed in size significantly as compared to conventional plants for manufacturing thermoplastic tubes, a plant of the present invention may be housed in a room with a controlled environment. Specifically a plant may be housed in room substantially free of dust and dirt to create a sterile environment for manufacturing, filling and packing thermoplastic tubes. The machines used in the present invention are suitable for use in a clean room because the machines of the present invention are significantly cleaner in operation than conventional process lines. The design of the machine affords little opportunity for dirt and grease to contact the thermoplastic sleeves and tubes. Also because there is less tube handling with a machine of the present invention, there is less chance of contamination during the manufacturing process.

The ability to locate a plant for manufacturing thermoplastic tubes in a room with a controlled environment, i.e., a clean room, has the advantage of producing thermoplastic tubes in a sterile environment. This is important to the pharmaceutical industry where contaminants in the thermoplastic tube or the contents are undesirable.

Figure 20:
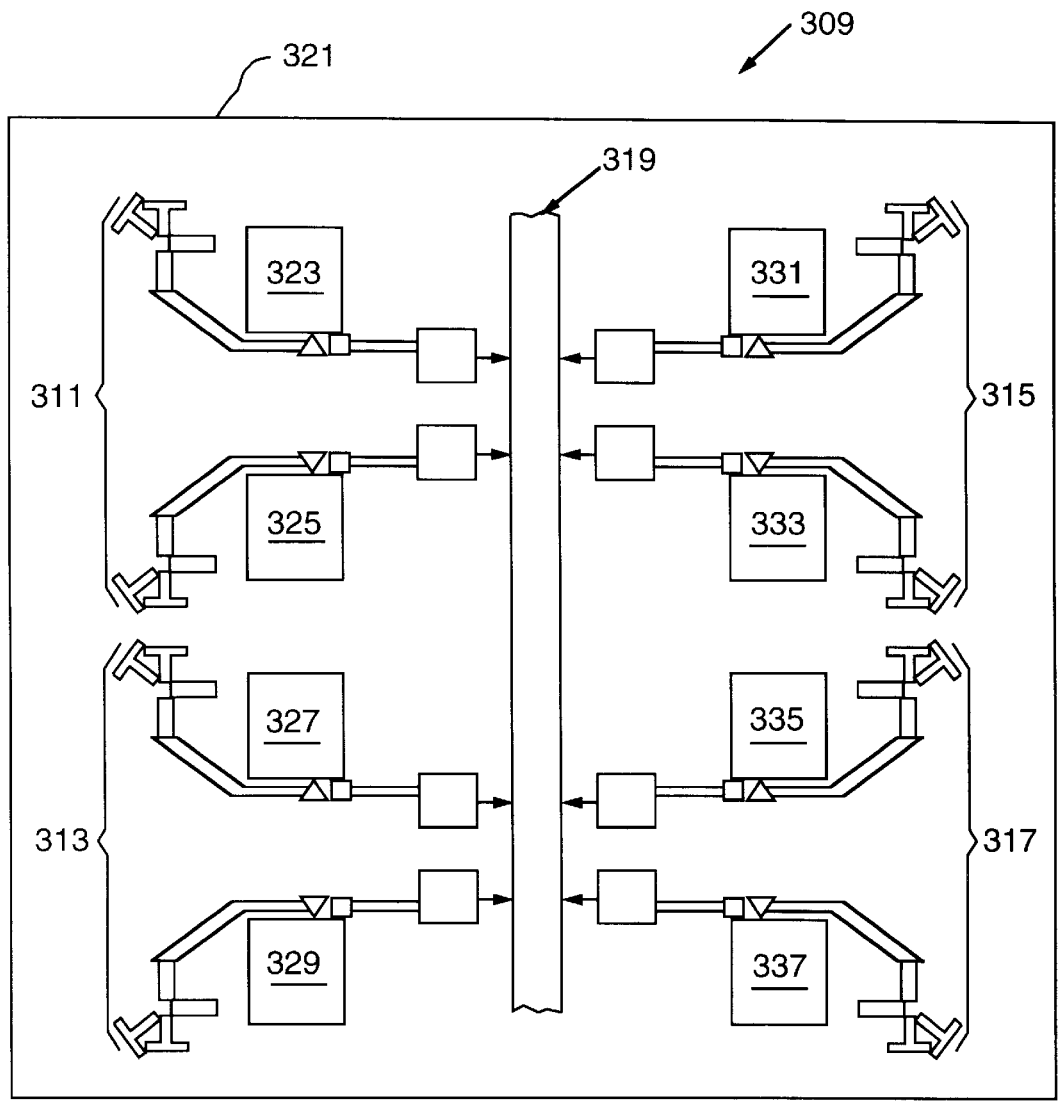
FIG. 20 is a schematic view of a plant of the present invention having 4 production cells similar to the production cell illustrated in FIG. 16.

FIG. 20 illustrates a first mini plant 309 having 4 production cells 311, 313, 315 and 317 each production cell 311–317 having two towers of three manufacturing machines each. Each production cell 311–317 is similar to the production cell 171, illustrated in FIG. 16, with similar shapes representing corresponding features. All production cells 311–317 are associated with a common product transportation line 319 for transporting packed finished tubes. Mini plant 309 is housed in a room 321 substantially free of dust and dirt for sterile processing. The operational flow of materials through the production cells 311–317 is the same as that through production cell 171, illustrated in FIG. 16.

If all manufacturing machines of towers 323, 325, 327, 329, 331, 333, 335, and 337 in production cells 311–317 in first mini plant 309 have a uniform manufacturing method, then first mini plant 309 is capable simultaneously producing 4 different types of tubes, one from each production cell. Therefore first mini plant 309 can simultaneously produce 4 types of thermoplastic tubes at the rate of approximately 120 tubes/min for each production cell. This is comparable to the production capacity of 4 conventional process lines except first mini plant 309 uses a fraction of the space necessary for 4 conventional process lines.

The number of workers in first mini plant 309 would, in principle be, 10 workers, one worker for each of the 8 towers 323–337 and two additional workers to monitor and maintain the 4 extrusion machines.

Figure 21:
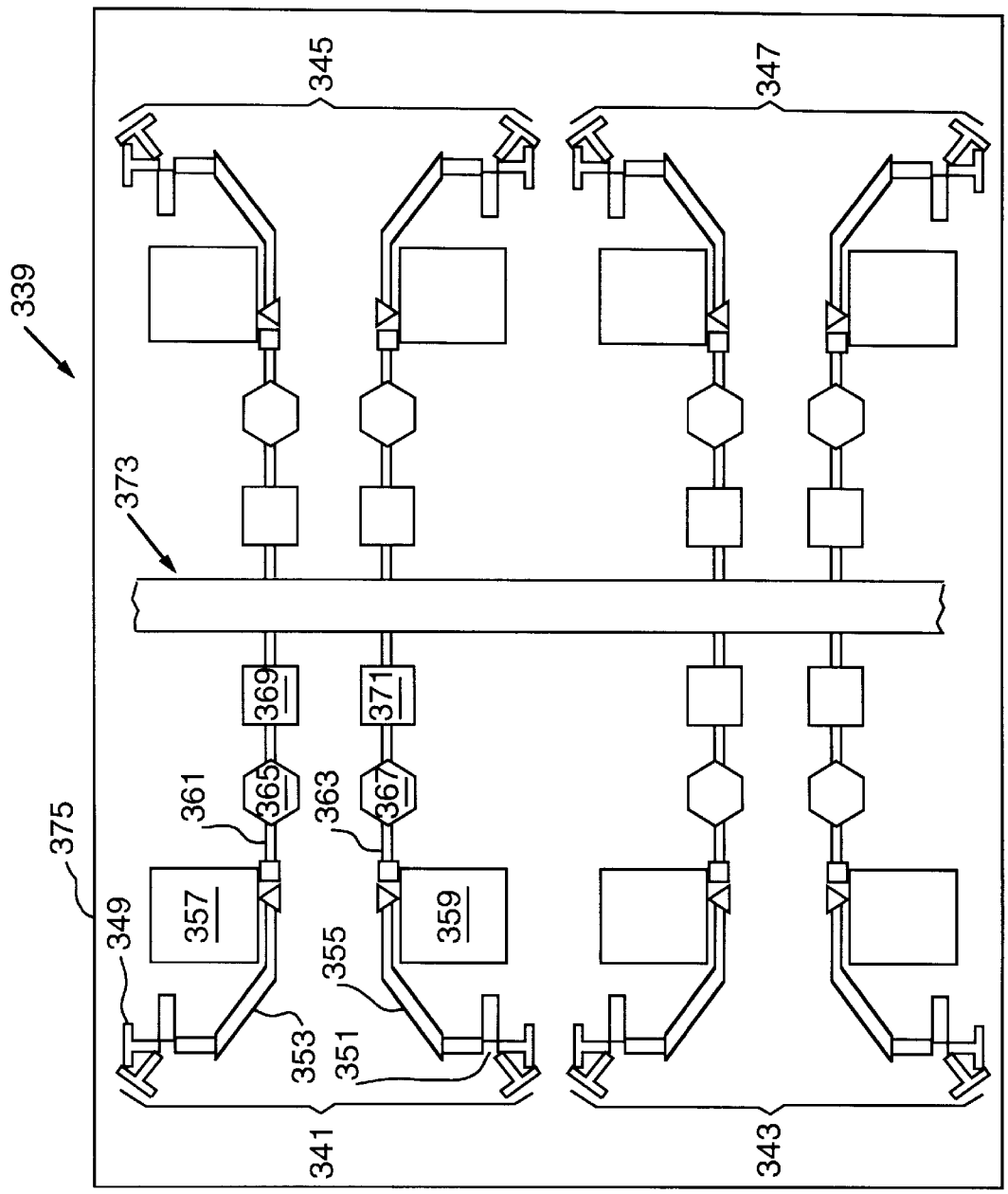
FIG. 21 is a schematic view of a plant of the present invention having 4 production cells similar to the production cell illustrated in FIG. 16, with the addition of filling machines.

FIG. 21 illustrates a second mini plant 339 with production cells 341, 343, 345, and 347. Production cell 341 has two extrusion machines 349 and 351 associated with sleeve conveyors 353 and 355, respectively. Each sleeve conveyor 353 and 355 feeds thermoplastic sleeves to towers 357 and 359, each having three manufacturing machines. Tubes are formed from the sleeves and are transported by tube conveyors 361 and 363 to filling machines 365 and 367 followed by transportation to packing machines 369 and 371. Finally the filled and packed tubes are transported to common product transportation line 373 which removes tubes from second mini plant 339. Production cells 343–347 operate in the same way as production cell 341. Mini plant 339 is housed in a room 375 substantially free of dust and dirt to create substantially sterile conditions for manufacturing, filling and packing thermoplastic tubes.

IV. Method of Operating a Plant of the Present Invention

The combination of individually controlled manufacturing stations, an indexing device i.e.) and indexing table or indexing drum, and a PLC device provide the combination of hardware necessary for total tube handling, total tube traceability and true process feedback control. Total tube handling is the ability for a manufacturer to handle tubes without losing control of the exact location of a tube in the plant. Total tube traceability is simply the method a manufacturer uses to locate any tube within the manufacturing plant, made possible by complete control over the handling of each individual tube. True feedback control is the gathering of information on the manufacturing process and the product manufactured and using this information to generate feedback control signals to operate the manufacturing stations of the manufacturing plant.

The advantages of tube control, tube traceability and true feedback control are numerous and has never before been realized. With total mechanical control over thermoplastic tubes combined with data gathered from each of the manufacturing stations for process control as well as the quality of the thermoplastic tube product, complete information may be assembled about the operation of the entire plant as well as the quality of the manufactured product. For example, information gathered from sensors on each manufacturing station of each thermoplastic tube manufacturing machine may be produced in real time for a manufacturer or accumulated at subsequent intervals to formulate reports about the operation of the manufacturing stations in the plant. Furthermore, information gathered about the quality of the thermoplastic tubes produced may be gathered in real time for the manufacturer or may be accumulated at intervals to form quality control reports. All of this information may be gathered for the purpose of optimizing the operation of the plant. And finally, information gathered from sensors on each manufacturing station may be sent to a PLC device and the control signals may be generated based on this information to provide a feedback loop for control of the manufacturing stations.

A summary of the method of operating a plant for manufacturing thermoplastic tubes is as follows:

providing at least one production cell having; at least one thermoplastic tube manufacturing machine, at least one packing machine, at least one extrusion machine, at least one sleeve conveyor, at least one means for transporting the tubes from the thermoplastic tube manufacturing machine to the packing machine; and at least one means for transporting the tubes from the packing machine to the common product transportation line; and extruding the hollow thermoplastic body from the extrusion machine; cutting the hollow thermoplastic body into sleeves; transporting the sleeves to the thermoplastic tube manufacturing machine; loading each of the sleeves onto a manufacturing station on the manufacturing machine; moving or advancing the sleeves relative to the manufacturing stations; forming each of the sleeves into a tube; and marking each of the tubes with individual indicia; recording information on each of the tubes, based on the individual indicia, by a recording means connected to a PLC device; unloading each of the tubes from the thermoplastic tube manufacturing machine; identifying each of the tubes, by means of the individual indicia, by an identification means connected to the PLC device; and based on the individual indicia, directing each of the tubes to a desired location.

Marking each thermoplastic tube with an individual indicia allows for tube traceability throughout the entire manufacturing plant. A machine of the present invention has the ability, through a computer controlled printing device, to print an individual and unique indicia on every thermoplastic tube produced. This individual indicia may be identified by an identification means like a vision camera or indicia reader, in order to trace the location of every individual tube.

Indicia marking is performed on the machine used in the present invention by a manufacturing station. A tube is marked after a head is formed on a thermoplastic sleeve. Alternatively, a sleeve could be marked with an individual indicia prior to forming a head thereon. In the preferred embodiment, after a tube is formed on the machine used in the present invention, an individual indicia is marked thereon. Preferably, a tube is marked with an indicia by a PLC controlled inkjet printer.

After a tube is marked with an individual indicia, the individual indicia on the tube is subsequently identified and recorded by a recording means. The recording occurs after the tube is marked. Preferably a recording means, like a vision camera or indicia reader/recorder, is located on a station of the machine used in the present invention. The marked tube advances to the recording station where the indicia marked on the tube is identified, recorded and the information is sent to a PLC device. The PLC stores the recorded information.

Since the information has been recorded, it may then be used to control the subsequent handling of the marked tube throughout the plant. Anywhere in the plant the tube needs to be handled, a tube identification means is combined with a PLC controlled handling apparatus. The control works as follows: A means for identifying and recording indicia on tubes is placed before tubes enter a mechanical tube handling apparatus: conveyor, machine, robot or device. The means for recording and identification, identifies and records the indicia of all tubes that pass in front it. The mechanical tube handling apparatus, for example a directional switch for diverting material flow on a conveyor, a pick-and-place robot, a tube conveyor, etc. can handle the tubes in a preselected order corresponding to individual indicia and can handle tubes based on commands from a PLC device which generates signals based on information received from the preceding identification and recording means. Thus the tubes are handled, moved, transported and directed through the plant based on the individual indicia on the tubes. By this method a manufacturer can have control over the transportation and handling of tubes in a plant.

Additionally, the directional orientation of the tubes can be maintained in a plant of the present invention by using handling equipment like pick-and-place robots that maintain directional orientation of tubes when handling them.

With the ability to mark each individual tube with an individual indicia and to locate each individual tube, it is possible to then control the transportation of each individual tube throughout the plant. A manufacturer may handle, transport, pack, fill the tubes based on set individual indicia. As an example, a manufacturer may segregate thermoplastic tubes in a preselected order based on the individual indicia on tubes. By combining an identifying or confirmation means with a process controlled switch on a transportation means, like a conveyor, a manufacturer may transport thermoplastic tubes to different locations.

As an example, to produce 15,000 tubes of the same diameter and to bulk pack the first 5000 tubes, fill the second 5000 tubes with contents and box pack the third lot of 5000 tubes the method of the present invention can be used. The tubes need to be transported based on individual indicia.

An open and close switch controlled by a PLC device on a transportation line can be used to divert the direction of tubes based on the individual indicia marked thereon. An identification and recording means identifies indicia on tubes and sends a signal based on this information to a PLC device. With the use of this information, the PLC device generates a command signal to operate the switch on the transportation line. Any type of confirmation means or identifying means such as a vision camera or bar code reader or any type of reader for individual indicia may be used. The PLC sends a signal to the switch to divert tubes to a new location upon the passing of the last tube in each lot marked with an indicia indicating the tube is number 5,000 in the lot. By this method the first 5,000 tubes can be sent to a bulk packer, the second 5,000 to a filling machine, and the third 5,000 to a box packer.

Furthermore the method of operating a plant can include feed back control of the machines in the plant of the present invention. This involves the following steps:

sensing selected information from the operation of each of the manufacturing stations of the thermoplastic tube manufacturing machine; generating a signal corresponding to each of the manufacturing stations based on selected information gathered; inputting the signals to a PLC device; and with use of the signals, controlling the operation of a corresponding manufacturing station with the PLC device.

The advantages of handling tubes based on individual indicia are numerous. Primarily though the manufacturing machinery may be optimized and down time and changeover time may be reduced.

While there has been illustrated and described several embodiments of the present invention, it will be apparent that various changes and modifications thereof will occur to those skilled in the art. It is intended in the appended claims to cover all such changes and modifications that fall within the true spirit and scope of the present invention.

What is claimed is:

1. A plant for manufacturing thermoplastic tubes having at least one production cell associated with a common product transportation line, each cell comprising:
   at least one thermoplastic tube manufacturing machine, having a plurality of manufacturing stations arranged in a closed path;
   at least one packing machine associated with said common product transportation line;
   at least one extrusion machine for extruding an elongated thermoplastic hollow body which is cut into sleeves, associated with a sleeve conveyor;
   at least one sleeve conveyor for transporting said sleeves from said at least one extrusion machine to said at least one thermoplastic tube manufacturing machine for manufacturing tubes from said sleeves;
   at least one means for transporting said tubes from said at least one thermoplastic tube manufacturing machine to said at least one packing machine; and
   at least one means for transporting said tubes from said at least one packing machine to said common product transportation line.

2. The plant according to claim 1, wherein said at least one production cell further comprises at least one filling machine for filling said tubes with contents through an open end of each said tube and sealing said open end, and said filling machine is associated with said at least one thermoplastic tube manufacturing machine and said at least one packing machine by transportation means.

3. The plant according to claim 1, wherein said at least one means for transporting said tubes from said at least one thermoplastic tube manufacturing machine to said at least one packing machine is a tube conveyor for transporting tubes.

4. The plant according to claim 1, wherein said at least one production cell comprises a plurality of thermoplastic tube manufacturing machines arranged horizontally.

5. The plant according to claim 1, wherein said at least one production cell comprises a plurality of thermoplastic tube manufacturing machines arranged vertically.

6. The plant according to claim 1, wherein said at least one production cell comprises a plurality of thermoplastic tube manufacturing machines arranged both horizontally and vertically.

7. The plant according to claim 1, wherein all manufacturing stations of said at least one thermoplastic tube manufacturing machine are operably associated with at least one PLC device.

8. The plant according to claim 1, wherein said at least one extrusion machine, said at least one sleeve conveyor, said at least one thermoplastic tube manufacturing machine, and said at least one packing machine of said at least one production cell are all operably associated with at least one PLC device.

9. The plant according to claim 1, wherein each said at least one production cell has six thermoplastic tube manufacturing machines and one extrusion machine, one sleeve conveyor and one packing machine are provided for every three thermoplastic tube manufacturing machines.

10. A plant for manufacturing thermoplastic tubes having at least one production cell associated with a common product transportation line, each cell comprising:
    at least one thermoplastic tube manufacturing machine, further comprising,
      an indexing device rotatable about a fixed shaft;
      means for supporting sleeves mounted on said indexing device for advancement along a closed path in response to rotation of said indexing device in a predetermined direction;
      means for loading said sleeves onto said supporting means in a first location of said closed path;
      means for forming a head on said sleeves to create tubes in a second location of said closed path downstream of said first location; and
      means for unloading said tubes from said supporting means in a third location of said closed path downstream said second location between said second and said first locations;
    at least one packing machine associated with said common product transportation line;
    at least one extrusion machine for extruding an elongated thermoplastic hollow body which is cut into sleeves, associated with a sleeve conveyor;
    at least one sleeve conveyor for transporting said sleeves from said at least one extrusion machine to said at least one thermoplastic tube manufacturing machine for manufacturing tubes from said sleeves;
    at least one means for transporting said tubes from said at least one thermoplastic tube manufacturing machine to said at least one packing machine; and
    at least one means for transporting said tubes from said at least one packing machine to said common product transportation line.

11. The plant according to claim 10, wherein said at least one production cell further comprises at least one filling machine for filling said tubes with contents through an open end of each said tube and sealing said open end, and said filling machine is associated with said at least one thermoplastic tube manufacturing machine and said at least one packing machine by transportation means.

12. The plant according to claim 10, wherein said at least one means for transporting said tubes from said at least one thermoplastic tube manufacturing machine to said at least one packing machine is a tube conveyor for transporting tubes.

13. The plant according to claim 10, wherein said at least one production cell comprises a plurality of thermoplastic tube manufacturing machines arranged horizontally.

14. The plant according to claim 10, wherein said at least one production cell comprises a plurality of thermoplastic tube manufacturing machines arranged vertically.

15. The plant according to claim 10, wherein said at least one production cell comprises a plurality of thermoplastic tube manufacturing machines arranged both horizontally and vertically.

16. The plant according to claim 10, wherein all manufacturing stations of said at least one thermoplastic tube manufacturing machine are operably associated with at least one PLC device.

17. The plant according to claim 10, wherein said at least one extrusion machine, said at least one sleeve conveyor, said at least one thermoplastic tube manufacturing machine, and said at least one packing machine of said at least one production cell are all operably associated with at least one PLC device.

18. The plant according to claim 10, wherein each said at least one production cell has six thermoplastic tube manufacturing machines and one extrusion machine, one sleeve conveyor and one packing machine are provided for every three thermoplastic tube manufacturing machines.

19. A plant for manufacturing thermoplastic tubes housed in a room substantially free of dust and dirt having at least one production cell associated with a common product transportation line, each cell comprising:
    at least one thermoplastic tube manufacturing machine, having a plurality of manufacturing stations arranged in a closed path;
    at least one packing machine associated with said common product transportation line;
    at least one extrusion machine, for extruding an elongated thermoplastic hollow body which is cut into sleeves, associated with a sleeve conveyor;
    at least one sleeve conveyor for transporting said sleeves from said at least one extrusion machine to said at least one thermoplastic tube manufacturing machine for manufacturing tubes from said sleeves;
    at least one means for transporting said tubes from said at least one thermoplastic tube manufacturing machine to said at least one packing machine; and
    at least one means for transporting said tubes from said at least one packing machine to said common product transportation line.

20. The plant according to claim 19, wherein said at least one production cell further comprises at least one filling machine for filling said tubes with contents through an open end of each said tube and sealing said open end, and said filling machine is associated with said at least one thermoplastic tube manufacturing machine and said at least one packing machine by transportation means.

21. A method for operating a plant for manufacturing thermoplastic tubes having at least one production cell associated with a common product transportation line, comprising:
    providing at least one production cell comprising,
        at least one thermoplastic tube manufacturing machine, having a plurality of manufacturing stations arranged in a closed path;
        at least one packing machine associated with said common product transportation line;
        at least one extrusion machine, for extruding an elongated thermoplastic hollow body which is cut into sleeves, associated with a sleeve conveyor;
        at least one sleeve conveyor for transporting said sleeves from said at least one extrusion machine to said at least one thermoplastic tube manufacturing machine for manufacturing tubes from said sleeves;
        at least one means for transporting said tubes from said at least one thermoplastic tube manufacturing machine to said at least one packing machine; and
        at least one means for transporting said tubes from said at least one packing machine to said common product transportation line;
    extruding said hollow thermoplastic body from said at least one extrusion machine,
    cutting said hollow thermoplastic body into sleeves;
    transporting said sleeves to said at least one thermoplastic tube manufacturing machine;
    loading each of said sleeves onto a manufacturing station on said at least one manufacturing machine;
    moving said sleeves relative to said manufacturing stations around said closed path;
    forming each of said sleeves into a tube;
    marking each of said tubes with individual indicia;
    recording information on each of said tubes, based on said individual indicia, by a recording means connected to a PLC device;
    unloading each of said tubes from said at least one thermoplastic tube manufacturing machine;
    identifying each of said tubes, by means of said individual indicia, by an identification means connected to the PLC device; and
    based on said individual indicia, directing each of said tubes to a desired location.

22. The method of operating a plant according to claim 21, which further comprises:
    sensing selected information from the operation of each of said manufacturing stations of said at least one thermoplastic tube manufacturing machine;
    generating a signal corresponding to each of said manufacturing stations based on said selected information;
    inputting said signals to a PLC device; and
    with use of said signals, controlling the operation of a corresponding manufacturing station with said PLC device.

* * * * *